(12) United States Patent
Lautzenhiser et al.

(10) Patent No.: US 10,189,236 B2
(45) Date of Patent: Jan. 29, 2019

(54) SYSTEM, METHOD, AND APPARATUS FOR MAGNETIC SURFACE COVERINGS

(71) Applicant: Golconda Holdings LLC, Bay St. Louis, MS (US)

(72) Inventors: Lloyd L. Lautzenhiser, Verdi, NV (US); Shane S. LeBlanc, Bay St. Louis, MS (US); Melinda LeBlanc, Bay St. Louis, MS (US)

(73) Assignee: Golconda Holdings, LLC, Bay St. Louis, MO (US)

( * ) Notice: Subject to any disclaimer, the term of this patent is extended or adjusted under 35 U.S.C. 154(b) by 0 days.

(21) Appl. No.: 15/083,231

(22) Filed: Mar. 28, 2016

(65) Prior Publication Data

US 2016/0319553 A1     Nov. 3, 2016

Related U.S. Application Data

(63) Continuation of application No. 15/083,225, filed on Mar. 28, 2016.
(Continued)

(51) Int. Cl.
*E04F 13/30* (2006.01)
*B32B 37/20* (2006.01)
(Continued)

(52) U.S. Cl.
CPC ............... *B32B 37/20* (2013.01); *B32B 5/02* (2013.01); *B32B 5/024* (2013.01); *B32B 5/16* (2013.01); *B32B 5/30* (2013.01); *B32B 7/08* (2013.01); *B32B 7/12* (2013.01); *B32B 25/02* (2013.01); *B32B 25/10* (2013.01); *B32B 27/12* (2013.01); *B32B 27/20* (2013.01); *B32B 27/22* (2013.01); *B32B 27/304* (2013.01); *B32B 37/1284* (2013.01); *D06N 7/0094* (2013.01); *E04F 13/072* (2013.01); *E04F 13/077* (2013.01); *E04F 13/0866* (2013.01); *E04F 13/0873* (2013.01); *E04F 13/0883* (2013.01); *E04F 13/30* (2013.01); *E04F 15/02144* (2013.01); *E04F 15/107* (2013.01); *B32B 37/0053* (2013.01); *B32B 37/04* (2013.01); *B32B 37/24* (2013.01); *B32B 38/0008* (2013.01); *B32B 38/1875* (2013.01); *B32B 2250/02* (2013.01);
(Continued)

(58) Field of Classification Search
CPC ..... E04F 13/30; E04F 13/072; E04F 13/0883; E04F 13/0866; E04F 13/0873; E04F 13/077
USPC ......................... 52/390, 391, 506.01, 506.05
See application file for complete search history.

(56) References Cited

U.S. PATENT DOCUMENTS 3,341,996 A * 9/1967 Jones ................ E04F 15/02144
427/127
3,378,974 A * 4/1968 Bush, Jr. ................ E04B 9/248
428/47

(Continued)

*Primary Examiner* — Joshua K Ihezie
(74) *Attorney, Agent, or Firm* — Duncan Galloway Egan Greenwald, PLLC; Kevin T. Duncan

(57) ABSTRACT

The present invention pertains to the art of floor coverings, and, more particularly to an apparatus for use in securing floor covering units to an underlay and a method of manufacturing said floor covering units and said underlay. More particularly, the present invention relates to an apparatus, method, and method of manufacturing magnetized floor covering units and magnetized underlays for securing magnetized floor covering units.

26 Claims, 14 Drawing Sheets

Related U.S. Application Data

(60) Provisional application No. 62/258,432, filed on Nov. 21, 2015, provisional application No. 62/139,226, filed on Mar. 27, 2015.

(51) Int. Cl.

| | | |
|---|---|---|
| *E04F 13/08* | (2006.01) | |
| *E04F 15/02* | (2006.01) | |
| *E04F 13/072* | (2006.01) | |
| *E04F 13/077* | (2006.01) | |
| *B32B 27/30* | (2006.01) | |
| *E04F 15/10* | (2006.01) | |
| *B32B 5/02* | (2006.01) | |
| *B32B 7/12* | (2006.01) | |
| *B32B 37/12* | (2006.01) | |
| *B32B 5/16* | (2006.01) | |
| *B32B 5/30* | (2006.01) | |
| *B32B 7/08* | (2006.01) | |
| *B32B 25/02* | (2006.01) | |
| *B32B 25/10* | (2006.01) | |
| *B32B 27/12* | (2006.01) | |
| *B32B 27/20* | (2006.01) | |
| *B32B 27/22* | (2006.01) | |
| *D06N 7/00* | (2006.01) | |
| *B32B 37/00* | (2006.01) | |
| *B32B 38/00* | (2006.01) | |
| *B32B 37/04* | (2006.01) | |
| *B32B 37/24* | (2006.01) | |

(52) U.S. Cl.
CPC ..... *B32B 2255/02* (2013.01); *B32B 2255/205* (2013.01); *B32B 2255/26* (2013.01); *B32B 2260/025* (2013.01); *B32B 2260/04* (2013.01); *B32B 2260/046* (2013.01); *B32B 2260/048* (2013.01); *B32B 2262/101* (2013.01); *B32B 2264/105* (2013.01); *B32B 2307/208* (2013.01); *B32B 2307/3065* (2013.01); *B32B 2307/706* (2013.01); *B32B 2307/708* (2013.01); *B32B 2307/7246* (2013.01); *B32B 2315/085* (2013.01); *B32B 2419/04* (2013.01); *B32B 2471/00* (2013.01); *B32B 2607/02* (2013.01); *D06N 2209/045* (2013.01); *D06N 2213/068* (2013.01)

(56) References Cited

U.S. PATENT DOCUMENTS

| | | | | |
|---|---|---|---|---|
| 3,629,756 | A * | 12/1971 | Holtz | H01F 7/0215 101/389.1 |
| 3,712,846 | A * | 1/1973 | Daniels et al. | E04B 1/86 181/290 |
| 3,852,935 | A * | 12/1974 | Jones | E04B 2/7457 52/238.1 |
| 3,862,515 | A * | 1/1975 | Baermann | E05C 19/161 428/900 |
| 4,058,335 | A * | 11/1977 | Abe | E05C 19/16 248/206.5 |
| 4,292,773 | A * | 10/1981 | Laing | A01G 9/1438 52/171.3 |
| 5,271,200 | A * | 12/1993 | Witt | A47G 27/0475 52/385 |
| 5,476,559 | A * | 12/1995 | Chiro | E04F 13/0883 156/310 |
| 5,524,373 | A * | 6/1996 | Plumly | G09F 7/04 40/600 |
| 5,927,033 | A * | 7/1999 | Kreckl | E04F 13/0883 156/310 |
| 6,271,156 | B1 * | 8/2001 | Gleason | B32B 21/10 442/413 |
| 7,373,747 | B1 * | 5/2008 | Wiemer | G09F 7/00 40/600 |
| 8,656,674 | B1 * | 2/2014 | Woodward | E04F 13/142 52/388 |
| 2004/0020569 | A1 * | 2/2004 | Kanekiyo | B82Y 25/00 148/302 |
| 2007/0275207 | A1 * | 11/2007 | Higgins | B32B 5/16 428/95 |
| 2008/0202053 | A1 * | 8/2008 | Guy | E04F 13/0883 52/391 |
| 2009/0053833 | A1 * | 2/2009 | Kikuchi | B82Y 10/00 438/3 |
| 2011/0067336 | A1 | 3/2011 | McDonald et al. | |
| 2011/0265409 | A1 | 11/2011 | Pien | |
| 2013/0125487 | A1 * | 5/2013 | Power | E04B 1/70 52/302.3 |
| 2014/0059961 | A1 * | 3/2014 | Yin | E04F 13/0826 52/426 |
| 2014/0318068 | A1 * | 10/2014 | Jakobsen | E04B 1/762 52/506.05 |
| 2014/0373473 | A1 * | 12/2014 | Collison | E04F 15/182 52/309.3 |
| 2015/0300003 | A1 * | 10/2015 | Jakobsen | E04B 1/762 52/506.05 |
| 2016/0055952 | A1 * | 2/2016 | Watanabe | H01F 1/16 33/361 |

* cited by examiner

SYSTEM, METHOD, AND APPARATUS FOR MAGNETIC SURFACE COVERINGS

CROSS-REFERENCE AND RELATED APPLICATIONS

The present invention is related to SYSTEM, METHOD, AND APPARATUS FOR MAGNETIC SURFACE COVERINGS, by Lautzenhiser et al., U.S. application Ser. No. 15/083,225, filed Mar. 28, 2016, and claims priority to U.S. Provisional Patent Applications U.S. Provisional Patent App. No. 61/139,226, entitled SYSTEM, METHOD, AND APPARATUS FOR THE MANUFACTURE AND INSTALLATION OF MAGNETIC FLOOR COVERING UNITS AND MAGNETIC UNDERLAYS, by Lautzenhiser et al., filed Mar. 27, 2015, and to U.S. Provisional Patent App. No. 62/258,432, entitled SYSTEM AND METHOD FOR MAGNETIC WALL COVERING UNITS AND MAGNETIC UNDERLAYS, by Lautzenhiser et al., filed Nov. 21, 2015, all of which are incorporated by reference herein in their entirety.

FIELD OF THE INVENTION

The present invention pertains to the art of floor and wall coverings, and, more particularly to an apparatus for use in securing floor covering units to an underlay and a method of manufacturing said floor covering units and said underlay and to a system and method for use in securing wall covering units to an underlay and a method of securing an underlay to a wall board.

BACKGROUND

A magnet is a material that can exert a noticeable force on other materials without actually contacting them. This force is known as a magnetic force and may either attract or repel. While all known materials exert some sort of magnetic force, it is so small in most materials that it is not readily noticeable. With other materials, the magnetic force is much larger, and these are referred to as magnets. Some magnets, known as permanent magnets, exert a force on objects without any outside influence. The iron ore magnetite, also known as lodestone, is a natural permanent magnet. Other permanent magnets can be made by subjecting certain materials to a magnetic force. When the force is removed, these materials retain their own magnetic properties. Although the magnetic properties may change over time or at elevated temperatures, these materials are generally considered to be permanently magnetized, hence the name.

All magnets have two points where the magnetic force is greatest. These two points are known as the poles. For a rectangular or cylindrical bar magnet, these poles would be at opposite ends. One pole is called the north-seeking pole, or North Pole, and the other pole is called the south-seeking, or South Pole. This terminology reflects one of the earliest uses of magnetic materials such as lodestone. When suspended from a string, the north pole of these first crude compasses would always "seek" or point towards the north. This aided sailors in judging the direction to steer to reach distant lands and return home.

Currently magnet applications include compasses, electric motors, microwave ovens, coin-operated vending machines, light meters for photography, automobile horns, televisions, loudspeakers, and tape recorders. A simple refrigerator note holder and a complex medical magnetic resonance imaging device all utilize magnets.

When making magnets, the raw materials are often more important than the manufacturing process. The materials used in permanent magnets (sometimes known as hard materials, reflecting the early use of alloy steels for these magnets) are different than the materials used in electromagnets.

In the field of modular floor covering unit installation, existing methods of installing such floor coverings typically involve a very labor and material intensive process. The process involves individually gluing down floor covering units using an adhesive. The adhesive is heavy, difficult to apply, costly, difficult to remove, and prone to failure. Using the prior art method, adhesive must be applied to the entire supporting surface or the entire underside of a floor covering unit. This process is costly in both labor and money and creates additional costs if floor covering units are to be replaced or removed.

Another method known in the art for installing modular floor covering units involves using adhesive connectors to connect modular floor covering units with adjacent units. Such "connector systems" of the prior art allow the modular floor covering to "float" on top of the supporting surface. These prior art systems use an adhesive to hold the edges of the adjacent flooring units together. One such system and method is the SYSTEM FOR CARPET TILE INSTALLATION, U.S. Pat. No. 8,434,282, issued May 7, 2013 (Scott et al.), which is incorporated herein by reference in its entirety. The method described in Scott et al. utilizes a one sided pressure sensitive adhesive tab that is approximately 72 mm square that has a releasable protective layer to join four sections of modular flooring units together. There a several problems with using this method to install a modular floor covering.

The modular flooring units are typically heavy in nature and the bond between the tile connector and modular flooring unit is relatively weak compared to traditional adhesives. In the Scott et al. tile connector, the connector is formed from an inert plastic that is coated with an adhesive. Although the connector is water resistant, it is not completely waterproof. This may cause the connector to fail under some conditions. Floor covering units are constantly under attack from moisture. The Scott et al. prior art claims the connectors are water resistant because the connectors only have adhesive on one side, the upwards facing side, making the connector less susceptible to moisture from the subfloor. However, this ignores adhesive failure from moisture sources above the connector. For example, a business such as a hotel may steam clean the floor covering unit connected by a Scott et al. type adhesive connector. Further the floor frequently may have liquids spilled on it and may experience wet winter conditions. This "wetting" occurs from above and moisture leeches down onto the face of the prior art connector, making it highly susceptible to moisture and potential connector failure.

The Scott et al. type prior art tile connectors have a high rate of failure in areas of heavy traffic and along modular flooring unit seams. Heavier traffic from office equipment, foot traffic, chairs etc. puts a strain on these connectors. The strain from heavier traffic may cause the connectors to fail in one or more ways.

The first type of failure for the Scott et al. type adhesive connectors is that the glue will stretch or fail under a heavy force such a chair rolling or other heavy object being moved across the floor covering. To address this problem, modular floor covering installers may use a spray adhesive in a can to supplement this type of adhesive connector system to give the seams of the modular floor covering extra strength.

However, doing so removes most of the advantages of this type of connector system and introduces volatile organic chemicals ("VOCs") into the installation area. VOCs present in the installation area require at a minimum additional ventilation and may also necessitate installing the modular floor covering after work hours when an area is subject to much lower traffic.

The second type of failure occurs if there is an excessive force in one direction. If such a force is imparted on the connector, the adhesive connector will fail altogether and "bunch up" underneath the modular flooring unit causing a "profiling" underneath that can be seen above the surface of the modular flooring unit.

Furthermore, the Scott et al. type prior art connector may only be used with modular floor covering units having a proprietary backing (e.g., a composite glass backing) that is used in the manufacturing process.

There also exist other carpet seaming methods for joining together two segments of floor covering material along long, straight seams. Such methods include CARPET SEAMING APPARATUS AND METHOD OF UTILIZING THE SAME, U.S. Pat. No. 5,800,664, issued Sep. 1, 1998 (Covert), and SEAMING APPARATUS AND METHOD, U.S. patent application Ser. No. 14/309,632, filed Jun. 19, 2014, (LeBlanc et al.), both of which are incorporated herein by reference in their entirety. Additional methods exist for securing modular floor covering units together in a "floating floor" configuration that overcomes the problems and issues presented by the Scott et al. prior art. Such methods include MODULAR CARPET SEAMING APPARATUS AND METHOD, U.S. patent application Ser. No. 14/618,752, filed Feb. 10, 2015, (Lautzenhiser et al.) which is incorporated herein by reference in its entirety.

Additionally, problems exist with the manufacture of modular floor covering units. All flooring coverings are cut into sections. The sections may be strips 12 feet in length and one to two feet wide, 24" by 24" square carpet tiles, or carpet strips or tiles in other standardized or custom lengths and widths. Flooring and in particular commercial flooring, which may be modular flooring units (e.g., carpet, vinyl, resilient flooring (vinyl composition tiles (VCT), luxury vinyl flooring (LVF), luxury vinyl tile (LVT) or luxury vinyl plank (LVP)), and hardwood), or carpet strips, is under constant stress at its seams due to any number of stresses on the seam. The stresses may include sub floor moisture and spills, glue degradation, stress caused by the movement of heavy objects, excessive foot traffic, temperature changes, or other environmental factors.

Currently modular flooring carpet, and in some instances broadloom carpet, is typically manufactured from a tufted carpet layer, a scrim layer, and a bonding agent layer. First, the bonding agent is created by first blending either a proprietary or standardized blend of raw materials that may be either pelletized or powered or both. The type of materials used may vary and depends on the intended use of the carpet but may include PVC, polypropylene, rubber, fiber glass, graphite, and various other compounds. Carpet or modular carpet for the carpet layer is typically tufted and further comprises a primary backing as part of the carpet layer. Initially, the carpet comprises the tufted fabric with a primary backing. The carpet enters the manufacturing line pre tufted and may be on a 12' or 15' roll. The carpet roll is then put through a series of rollers to be stretched out to the desired tension. This tensioning reduces the likelihood of wrinkles forming in the finished carpet when the secondary backing is bound to the tufted fabric and primary backing later in the manufacturing process.

At the same time as the tufted fabric is being tensioned, a roll of scrim tape, which may comprise a fiberglass scrim tape, is also similarly tensioned. The pellet and powder mix described above is also blended and heated to form a semi solid compound that may have a viscosity and consistency similar to a caulking material. The fiberglass scrim tape, which is under a tension force and stretched flat on an assembly line, is constantly moving at a set forward speed through the assembly process.

The blended semi solid compound is squirted out of nozzles directly onto the fiber glass scrim tape and subsequently squeegeed to a desired height and thickness. The squeegeeing process is guided by a set of edge dividers. This process causes the semi-solid compound to join with and be pressed into the fiberglass scrim tape, forming a single fiber tape and semi-solid compound layer. This fiber glass scrim with the semi-solid compound is then compressed beneath the aforementioned tufted fabric by a series of rollers forming a sandwiched layer of tufted fabric, primary backing, semi-solid compound, and fiberglass scrim tape. After these components have been joined or bonded together, the layers are baked in an oven at a constant temperature while still being moved along the assembly line. After the baking process, one or more coatings may be applied to the now finished backing system and carpet roll. After the compression and baking stages of the process, the now finished carpet moves on to be laser cut. The cut carpet is then buffed on the edges to remove the stray tufts of fabric and bits of scrim or "fuzzies" from said cut carpet. The aforementioned manufacturing process is typically used for manufacturing modular flooring carpet units.

Carpet manufactured according to the aforementioned process is subject to a curling force at its edges due in part to the process involved in manufacturing the carpet. This curling stress adds to the external stresses on carpet seams. This type of curling stress is particularly problematic in modular flooring applications. Typically as part of the manufacturing process broadloom carpet or modular flooring goes through a heat up and cool down process in an environmental chamber that occurs after the primary assembly of the carpet or modular flooring unit is complete, i.e., after the carpet has been compressed, baked, and cut. The environmental chamber will change the relative humidity and temperature from one extreme to another, e.g., high to low or low to high, causing the carpet to curl in a particular direction. Depending upon which direction the carpet curls, the batch of carpet will undergo a process wherein the exact opposite curling will be applied to the carpet. Applying this type of treatment and curling process to the carpet reduces the probability of the edges of the carpet curling up at the seams after installation of said carpet.

Additionally with some existing magnetic floor covering systems, the floor coverings must be installed in a certain direction relative to the underlayment as the systems are anisotropic and may only be installed in one particular orientation.

In the field of wall coverings, the process of constructing wall coverings is time consuming, expensive, and messy. In typical residential and commercial buildings, a frame is erected for interior walls. On this frame a set of gypsum, sheetrock, or drywall boards are typically hung. These drywall boards are attached with screws or nails to the frame, which may be metal or wood. The boards must then be finished prior to painting. The finishing process for drywall boards typically involves mudding and taping. Mudding involves applying a wet-mix compound to mesh or paper tape that has been applied to the seams of the drywall board. The seams and edges must then be sanded prior to finishing. The finishing of drywall boards typically involves priming the surface with a primer type paint and then painting on the final wall cover on the primed surface. This process creates particulate dust contaminants that are difficult to clean and control. The process also may create an undesirable chemical smell due to volatile organic compounds ("VOCs") present in the paint, primer, and drywall boards.

Other methods of finishing a wall include: using wood boards or panels including "ship-lap" style panels; applying stone, masonry, or brick; applying wall-paper using glue and a decorated paper roll; applying wall trim pieces; and securing thin wooden boards and applying a plaster coating. For any of these methods, it may also be desirable to insulate the wall by placing an insulation layer for thermal or acoustic insulation behind the finished wall. Insulating is an additional step that must be completed prior to finishing the wall and may be time consuming and messy.

For all of the above mentioned methods, replacing the covering may be difficult and time consuming. Replacing a masonry wall covering, for example, requires extensive demolitions and clean-up. Replacing wall-paper may require replacing the drywall board the paper is secured to. Many of the above methods require destructive removal to replace.

Additionally, gymnasiums, fitness facilities, tennis courts, parks and recreation and any other like facility all have problems with constant wear and tear from the environment, people etc., and are very hard to maintain and clean properly. They are also typically single purposed with no ability to be used for anything but the given activity the surface was designed for. The underlayment could have a peel and stick adhesive backing, or an attached shock pad needed for some sports, or attached cushion for playgrounds to meet ASTM standards.

Furthermore, in current countertop installations, whether a countertop is granite, stone, tile, laminate, or any other material, it is conventionally applied using a concrete like substance, an epoxy or an adhesive substance that is permanent. Typically, a plywood board is cut into the shape of the underlying cabinets and is screwed into the cabinets. Then a concrete board is screwed into the substrate board if a tile product is going to be the finished layer. Then the finished product is laid upon either the single plywood substrate or dual substrate depending on the finished product. In this manner the countertop is permanently affixed to the cabinets. If an end user wished to change their countertop, it would be impossible to do without tearing the countertop back down to the cabinets. In this process there is significant potential to also damage the underlying cabinets and is a time consuming process leaving the kitchen area unusable for a prolonged period of time.

Additionally, in existing roofing systems, whether a roof is covered with shingles, metal sheets, terra cotta or other stone, the roof is installed over a composite wood and glue type board that has a "tar" paper or other underlayment type material to resist moisture. The materials tend to overlap each other and flashing materials are put into corners and a caulk like material around vents to create a water tight roof. Shingled roofs are made almost exclusively with petro chemical (oil) based products with a grit like sand that has been dyed to a specific pattern. If a problem occurs in these roof systems it is very expensive to identify a problem, because of the "overlapping" of the finish coat to ensure a water type seal. This is a permanent product and if there is a failure (e.g., leak) large areas must be removed and replaced all the way down to the substrate. It is often difficult to match a repair to the remaining roof structure so that it looks seamless.

What is needed is a direction independent method for installing modular floor covering units that does not requiring the gluing down of the floor covering units to provide for simple replacement and re-use of the modular floor covering units whether the floor covering units are carpet, vinyl flooring, resilient flooring, or hardwood flooring and a system and method for installing modular wall covering units that does not require the use materials that are difficult to install and is easy to replace. Additionally, what is needed is a magnetic direction independent underlayment configurable in various configurations suiting the individual facility and a magnetically receptive top coat that is quasi-permanent but is easily removed when the top coat needs to be cleaned, has outlived its lifespan, or requires a change in use. Also, what is needed is a modular roofing system that has a magnetic bond, that allows a roof to hold up to various building codes in strength, is lighter weight and can be made with other "greener" materials. Moreover, what is needed is a quasi-permanent bond that is strong enough to hold the finished countertop material in place, but also be removed with little to no abatement.

SUMMARY OF INVENTION

The present invention provides a system, apparatus, and method for installing direction independent magnetized modular floor covering units on a magnetized underlay. The present invention provides a system and method for the manufacture of magnetic flooring and a method for installing a floor covering system that solves seaming and installation problems of prior art installation methods. The present invention comprises a two component system comprising a magnetized underlay and an attracting floor covering unit. The present invention also provides a direction independent modular magnetic wall covering system that is a "complete construction system". The modular magnetic wall covering system of the present invention may be used to finish a wall without the need for additional components or layers.

Typically, when installing modular floor covering units onto a subfloor the modular floor covering units are directly applied to the subfloor, which may be a concrete substrate, or to a vapor barrier underlay already applied to the subfloor. The modular floor covering units are then adhered to either the subfloor using one of a variety of methods. In a first method, the modular floor covering units are completely glued down to the subfloor; this is the prevailing method. In a second method, a clip connector system, which may be called a "floating floor", is used. Examples of floating floor systems include Scott et al. and Lautzenhiser et al. described hereinabove. In the floating floor installation method, the floor covering unit is not adhered or attached to the substrate or subfloor, but is instead attached to adjacent floor covering units using a connector, e.g., a carpet clip. The present invention uses a magnetic underlay that may comprise a two or three layer underlayment but may also comprise other layer configurations.

The present invention may also be utilized in the automotive industry where the floor covering would be cut out into the desired pattern, heated up, and then put into a mold. The floor covering would then be cooled to set its shape to the specifications of a particular manufacturer's car. Before the floor covering unit is heated up, cut, put into the mold, and cooled, the actual floor covering unit would pass under the high powered magnet on the conveyer belt. The carpet mat that lies on top on the carpeting in the car has a backing. In the backing process a powdered alloy would be put into the mix. With this system the molded floor covering unit in a car would make sure that the car mat would stay in place. It would significantly increase passenger safety as there are many accidents involving a car mat that bunched up suddenly by the driver moving his/her feet causing the matt to bunch under the cars brake, clutch, and accelerator pedals.

Currently, in the floor covering unit business, it is not cost effective to use advertising on a floor covering unit. Due to the installation cost and the time required to change, it has not been prudent to use this as an advertising opportunity.

Using the floor covering and underlay of the present invention, a department store, for example, could use either modular or rolled floor covering units and with an advertiser's brand printed onto the finish, coat, or surface of the floor covering unit. Designs could also be woven into the tufted fabric of the carpet itself, or different colored or patterned tiles or strips of carpet, vinyl flooring, resilient flooring, or hardwood flooring, could be placed to form designs, patterns, words, etc. When an advertisement campaign is over, or when the store wishes to display another advertiser or promote another product or brand, the floor covering unit can easily be changed out with another one and the old floor covering unit may be stored to be used again at a later date.

Another application of the present invention may for use in the home. For example, if a homeowner has an affinity for a particular sports team, or a child loves a certain "favorite" film or TV character, floor covering units with a pattern, color, or design could be easily installed in the home and replaced when the owner's tastes change. With conventional floor covering units, a homeowner would not customize their home so radically because of the significant labor cost and installation expertise associated with traditional carpets and floor coverings. Stylized floors with specific designs are typically not used except in situations such as on the floor of football team lockers or specific at certain department store chains. Using the method and system of the present invention, only the floor covering units need to be changed. Each time a new floor covering unit is changed, the same magnetized underlayment is utilized. A layman unskilled in carpet installation would also be able to change the floor covering unit without the help of a professional installer. With this rapid and inexpensive way of using floor covering units, commercial branding or media tie-ins using floor covering units are available for the first time in a manner that is not cost prohibitive.

For example, a little girl for her 4th birthday may want a "Disney's Tinker Bell" floor covering for her room. At 6 years old her tastes may change and her favorite character may now be "Winney the Pooh", and at later at age 12 it may be her favorite pop band. Using the floor coverings of the present invention, only the top floor covering would need to be replaced and the underlayment may be used over and over. The homeowner would not have to call a floor covering installation specialist to replace the floor coverings each time tastes changed. As the present invention does not require any seaming that would take an expert to do, the homeowner will be able to replace the floor covering unit themselves.

The modular magnetic wall covering system of the present invention is a benefit for the construction industry and an improvement over the prior art because it eliminates the need for drywall. Drywall is an imperfect product. In construction, a mandated Fire rating must be met for local and municipal codes, sound absorption must be provided, and the drywall must be properly finished. Drywall must do all of these things and be the finished layer in a finished wall. The modular magnetic wall covering system of the present invention eliminates the need for drywall and all of its associated costs by using a wall board comprised of a lighter, more fire resistant material such as mineral wool. The present invention greatly reduces mold and moisture issues that result from moisture trapped under flooring materials. In high rise construction, currently wall construction cannot begin until the building has been hung with exterior glass, cladding, or cast materials. This is because the gypsum drywall has a paper layer that is organic in nature. In a building system, moisture may become trapped under the floor covering and permeate the walls. The gypsum absorbs the moisture and the absorbed moisture may cause mold growth. If a building were to have a water pipe break, mold may grow on the walls within hours. With the system of the present invention, the materials used for wall and floor covering have very little to no organic materials in them. By having a small organic material component, the present invention drastically reduces or eliminates significant and costly moisture issues. Furthermore, dehumidifiers and/or heaters must be brought into the building process for gypsum walls in the winter/summer provide for the conditions that eliminate mold growth and enable the gypsum drywall seaming to dry in an acceptable time frame. The ability to work on the inside of a building before the outside of the building is finished will equate to an enormous time and monetary savings in construction projects.

General contractors and construction companies using the modular magnetic wall covering system of the present invention may offer residential and commercial real estate developers a safer product with the much higher fire ratings than those offered by drywall type construction, green labeling, heating and cooling efficiency, and lower construction costs while providing the consumer with the ability to customize their "completely interchangeable box" in which they work and live. The invention can provide semi-permanent o removable wall units and may be used in applications such as conventions and exhibit halls for quickly adapting temporary wall structures with a versatile, custom wall covering system.

A further benefit of the modular magnetic wall covering system of the present invention is that it will enable the use of the "completely interchangeable box" system for wall, floor and ceiling coverings. The system and method in the present invention may be employed with the modular magnetic wall covering system of the present invention to provide a consumer with a room or house that is a "completely interchangeable box" that may be customized easily and quickly. Additionally, using magnetic underlayment on multiple surfaces will lower the magnetic sheeting costs through economies of scale to a level that could not be matched by any other materials.

The construction industry is moving towards modular construction. Finished products are modularized in factories then the finished goods are brought to the construction site. The modular magnetic wall covering unit of the present invention is easier to construct, easier to transport and easier to fix errors with than existing wall finishing or covering methods. There is a large market for a modular magnetic wall covering system.

In one embodiment the present invention provides a system for finishing a wall comprising: a set of modular wall covering units comprising an inner attractant layer and a decorative outer layer; a magnetic underlayment comprising anisotropic or isotropic magnetic sheeting; and a support layer comprising a wall board, an insulation layer, and a covering layer.

The system of the above embodiment may further comprise a frame. The system may further comprise wherein the support layer is disposed on the frame. The system may further comprise wherein the decorative layer is adapted to resemble the appearance of tile, plaster, wood, slate, granite, painted wall, wall paper, Venetian plaster, wainscoting, trim wood, branding, logos, or art. The system may further comprise wherein the magnetic underlayment is permanently bonded to the support layer. The system may further comprise wherein the magnetic underlayment is affixed to the support layer by an adhesive or by a fastening means. The system may further comprise wherein the magnetic underlayment is supported by a fastening apparatus. The system may further comprise wherein the set of modular floor covering units are adapted to be releasably attached to the magnetic underlayment. The system may further comprise wherein the wall board comprises mineral wool. The system may further comprise wherein the covering layer comprises a flame retardant outer layer. The system may further comprise wherein the insulation layer comprises fire retardant glass fibers. The system may further comprise wherein the support layer does not require finishing.

In another embodiment the present invention provides a method for decorating a surface comprising: securing a magnetic underlayment to said surface; and releasably attaching a set of modular wall covering units to the magnetic underlayment. The method may further comprise attaching a supporting layer to a frame and affixing the magnetic underlayment to the supporting surface.

In another embodiment, the present invention provides a method for manufacturing a magnetic floor underlay comprising: blending a binding compound, the binding compound comprising a plasticizer and a metallic compound; stretching a scrim layer; heating the binding component to a semi-solid state; extruding the binding compound over the scrim layer; spreading the binding compound evenly over the scrim layer; heating the binding compound and scrim layer to set the binding compound into a solid state; pressing a vapor barrier layer onto the binding compound and scrim layer forming an underlay; and magnetizing the underlay.

In this embodiment, the metallic compound may comprise iron or steel granules or powder or any suitable ferromagnetic compound. The binding compound may comprise PVC, polypropylene, rubber, fiberglass, graphite, or any other suitable compound blend or binding compound. The scrim layer may be a fiberglass scrim tape. The spreading may be performed by a squeegee guided by a set of edge dividers. The vapor barrier may be a silicone vapor barrier. The scrim layer may be stretched by a set of rollers. The vapor barrier may be tensioned by a set of rollers. The vapor barrier may be pressed into the binding compound and scrim layer by a set of sandwich rollers. The underlay may be magnetized by a set of magnetic rollers. The magnetic rollers may comprise Neodymium Iron Boron (NdFeB or NIB), Samarium Cobalt (SmCo), Alnico, Ceramic or Ferrite, or Super Magnet type magnets. The heating of the binding compound and scrim layer may be performed by an oven.

In another embodiment, the present invention provides a method for manufacturing a floor covering comprising: blending a binding compound, the binding compound comprising a plasticizer and a metallic compound; stretching a scrim layer; heating the binding component to a semi-solid state; extruding the binding compound over the scrim layer; spreading the binding compound evenly over the scrim layer; pressing a floor covering layer onto the binding compound and scrim layer; and heating the binding compound, scrim layer, and floor covering layer to set the binding compound into a solid state.

In this embodiment, the metallic compound may comprise iron or steel granules or powder or any suitable ferromagnetic compound. The binding compound may comprise PVC, polypropylene, rubber, fiberglass, or graphite. The scrim layer may be a fiberglass scrim tape. The spreading may be performed by a squeegee guided by a set of edge dividers. The floor covering layer may be a tufted carpet layer having a primary backing. The scrim layer may be stretched by a set of rollers. The floor covering layer may be tensioned by a set of rollers. The floor covering layer may be pressed into the binding compound and scrim layer by a set of sandwich rollers. The heating of the floor covering layer, binding compound, and scrim layer may be performed by an oven. The floor covering layer may be cut into a set of floor covering units or may be rolled into a roll. The cutting may be performed by a laser, ceramic sheer, or other suitable cutting methods.

In another embodiment, the present invention provides a system for manufacturing a magnetic underlay, the system comprising: a roll of scrim material; a set of tensioning rollers adapted to tension the scrim material as it is unrolled; a roll of vapor barrier material; a set of tensioning rollers adapted to tension the vapor barrier material as it is unrolled; a hopper adapted to store a heated binding compound, the binding compound having a metallic component; a nozzle adapted to dispense the binding compound on the scrim material; a squeegee adapted to evenly distribute the binding compound; an oven adapted to heat the scrim material and binding compound to set the binding compound; a set of rollers adapted to press the vapor barrier material into the binding compound and scrim material; and a magnetizer adapted to magnetize the metallic compound in the binding material.

In yet another embodiment, the present invention provides a system for manufacturing a floor covering adapted to be used with a magnetic underlay, the system comprising: a roll of scrim material; a set of tensioning rollers adapted to tension the scrim material as it is unrolled; a roll of floor covering material; a set of tensioning rollers adapted to tension the floor covering material as it is unrolled; a hopper adapted to store a heated binding compound, the binding compound having a metallic component; a nozzle adapted to dispense the binding compound on the scrim material; a squeegee adapted to evenly distribute the binding compound; a set of rollers adapted to press the floor covering material into the binding compound and scrim material; and an oven adapted to heat the scrim material and binding compound to set the binding compound.

In yet another embodiment, the present invention provides a method for installing a floor covering, the method comprising: placing an underlay on a subfloor, the underlay having been magnetized in a manufacturing process; and placing a floor covering layer on the magnetized underlay, the floor covering layer comprising a metallic compound embedded in the floor covering layer in a manufacturing process. The underlay may be placed on the subfloor in a floating floor configuration or may be directly glued to the subfloor in high traffic or heavy wear areas.

In still another embodiment, the present invention provides a system for installing a floor covering, the system comprising: an underlay on a subfloor, the underlay having been magnetized in a manufacturing process; and a floor covering layer adapted to be placed on the magnetized underlay, the floor covering layer comprising a metallic compound embedded in the floor covering layer in a manufacturing process.

In one embodiment the present invention provides a system for finishing a wall comprising: a set of modular wall covering units comprising an inner attractant layer and a decorative outer layer; a magnetic underlayment comprising an isotropic magnetic sheeting; and a support layer comprising a wall board, an insulation layer, and a covering layer.

The system may further comprise a frame. The system may further comprise wherein the support layer is disposed on the frame. The system may further comprise wherein the decorative layer is adapted to resemble the appearance of tile, plaster, wood, slate, granite, painted wall, wall paper, Venetian plaster, wainscoting, trim wood, branding, logos, or art. The system may further comprise wherein the magnetic underlayment is permanently bonded to the support layer. The system may further comprise wherein the magnetic underlayment is affixed to the support layer by an adhesive or by a fastening means. The system may further comprise wherein the magnetic underlayment is supported by a fastening apparatus. The system may further comprise wherein the set of modular wall covering units are adapted to be releasably attached to the magnetic underlayment. The system may further comprise wherein the wall board comprises mineral wool. The system may further comprise wherein the covering layer comprises a flame retardant outer layer. The system may further comprise wherein the insulation layer comprises fire retardant glass fibers. The system may further comprise wherein the support layer does not require finishing.

In one embodiment the present invention provides a method for finishing a wall comprising: attaching a support layer comprising a wall board, an insulation layer, and a covering layer to a support frame; securing a magnetic underlayment comprising an isotropic magnetic sheeting to the covering layer of the support layer; and releasably and magnetically attaching each of a set of modular wall covering units comprising an inner magnetically receptive layer and a decorative outer layer to the magnetic underlayment.

The method may further comprise wherein the decorative layer is adapted to resemble the appearance of tile, plaster, wood, slate, granite, painted wall, wall paper, Venetian plaster, wainscoting, trim wood, branding, logos, or art. The method may further comprise wherein the magnetic underlayment is permanently bonded to the support layer prior to attaching the support layer to the support frame. The method may further comprise wherein the magnetic underlayment is affixed to the support layer by an adhesive or by a fastening means. The method may further comprise wherein the magnetic underlayment is supported by a fastening apparatus. The method may further comprise wherein the wall board comprises mineral wool. The method may further comprise wherein the covering layer comprises a flame retardant outer layer. The method may further comprise wherein the insulation layer comprises fire retardant glass fibers. The method may further comprise wherein the support layer does not require finishing.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
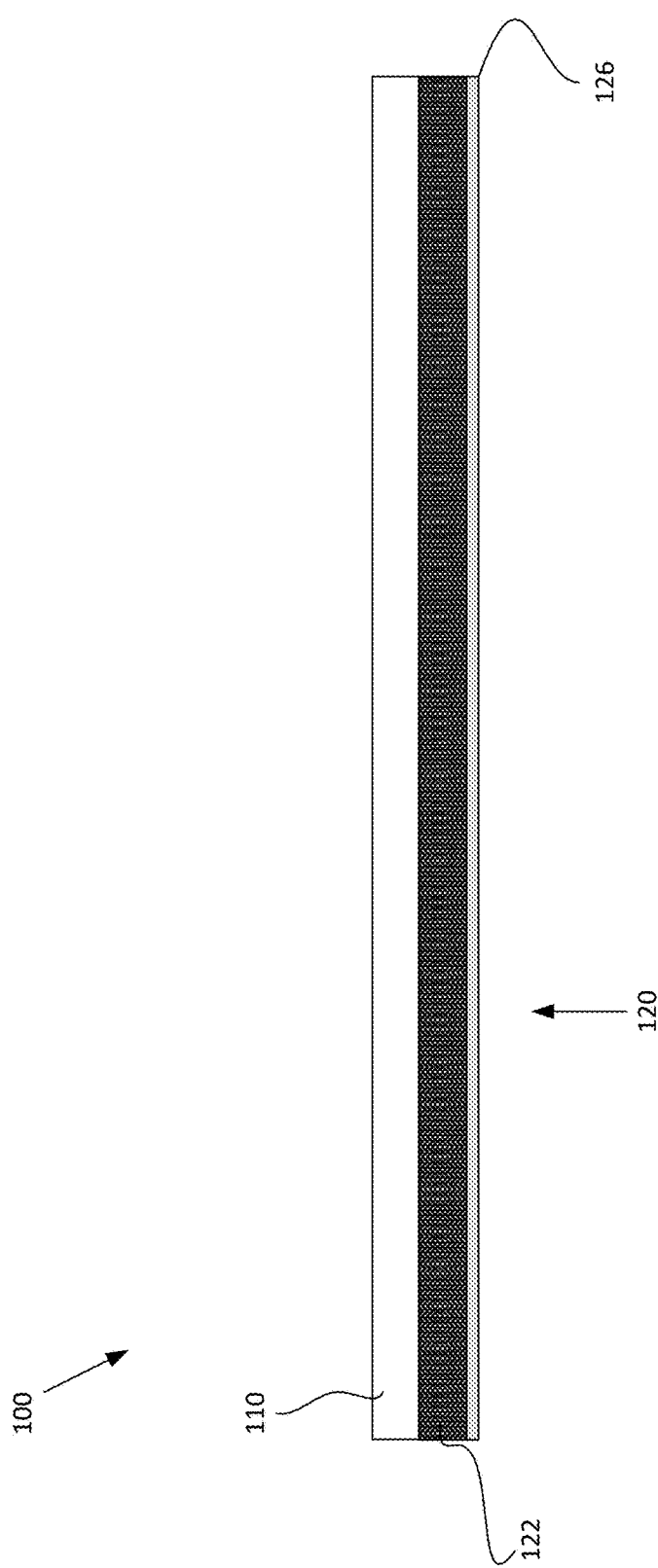
FIG. 1 is a side cross-section view of an embodiment of a carpet layer and magnetic underlay of the present invention.

With reference now to FIG. 1, a side cross-section view of an embodiment of an installed floor covering unit 100 comprising a floor covering layer 110 and magnetic underlay layer 120 is provided. The top layer is the floor covering layer 110. The floor covering layer 110 is placed on the magnetic underlay layer 120. The magnetic underlay layer 120 comprises the magnetized layer 122 and the vapor barrier 126. An embodiment of the process for producing the magnetic underlay layer 120 is shown in detail in FIG. 4 and an embodiment of the process for producing the floor covering layer 110 is shown in detail in FIG. 5.

Figure 3:
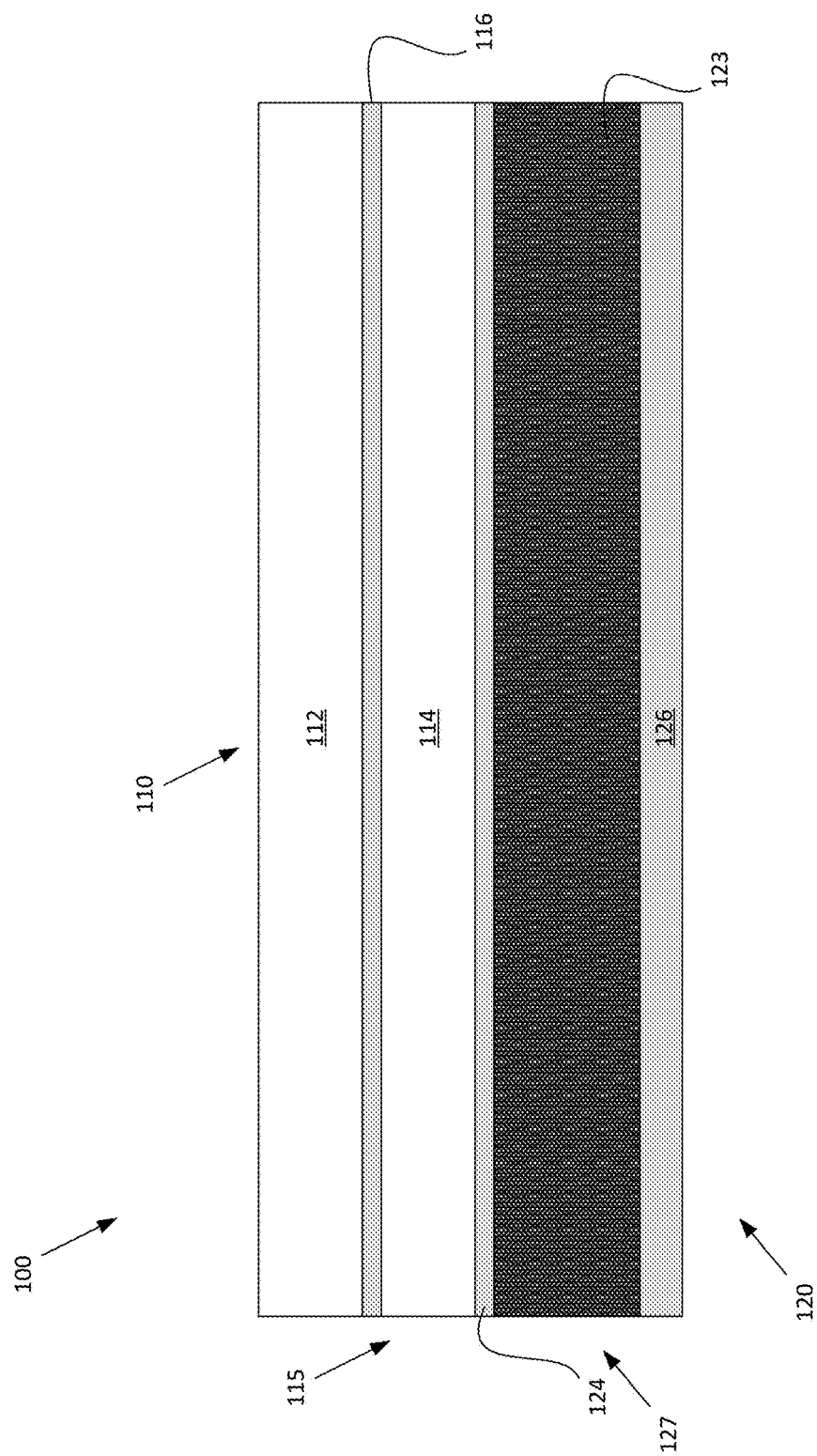
FIG. 3 is a detailed cross-sectional view of a carpet layer and magnetic underlay of the present invention.
Figure 4:
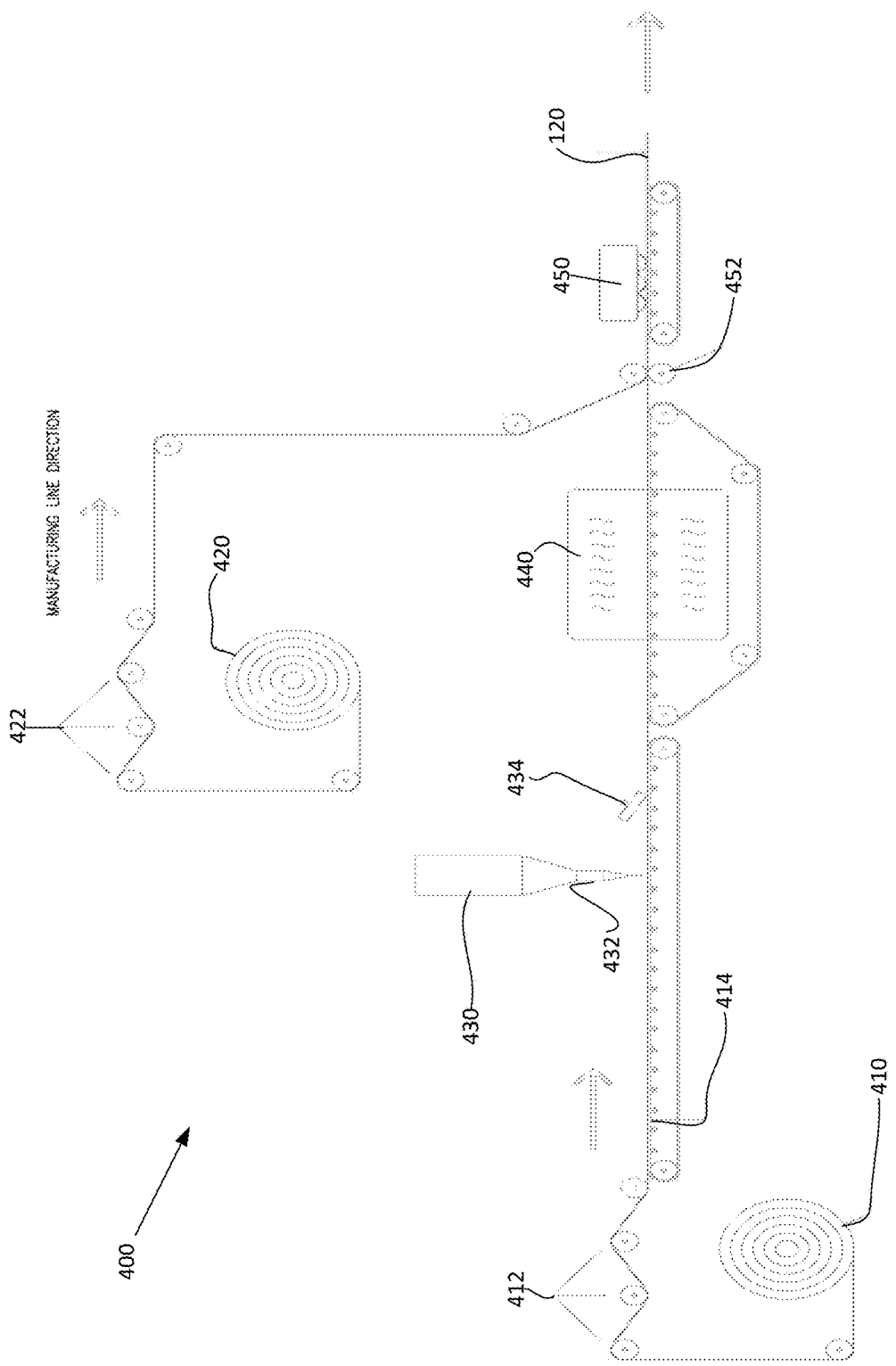
FIG. 4 is a simplified view of an embodiment of the process for manufacturing a magnetic underlay of the present invention.

With reference now to FIG. 4, an embodiment of the process 400 for manufacturing a magnetic underlay layer 120 is provided. Three primary components comprise the magnetic underlay layer 120: the fiberglass scrim component 123, shown in FIG. 3, from the roll of fiberglass scrim 410, the vapor barrier component 126 from the roll of silicone vapor barrier 420, and the semi-solid liquid blend 124, shown in FIG. 3, from the hopper 430.

The magnetic underlayment 120 may be magnetized to a set number of poles according to the process 400. First, a scrim layer 123, made from fiberglass or various other suitable compounds and blends typically used in the industry, is unrolled from a roll 410 through a set of rollers 412 that stretch and apply a tension to the scrim layer 123. The bottom layer in this process may be a vapor barrier 126 unrolled from the roll 420. The vapor barrier 126 provides the underlayment 120 with moisture resistance. A blending of the compounds described above for the manufacture of a carpet layer, e.g., PVC, polypropylene, rubber, fiber glass, graphite, and various other compounds, is blended in the hopper 430. An additional "metal", metallic, or ferro-magnetic compound which may comprise extra fine granules of iron powder or stainless steel powder or any other ferromagnetic alloy is also combined with the mixture in the hopper 430.

The underlay 120 is combined by first stretching the scrim 123 through rollers 412 and then passing the scrim over a conveyor belt 414 to the hopper 430 and the one or more nozzles 432 containing the compound blend. The blended raw materials compound with the additional blended alloys component is heated up to a semi solid form in the hopper 430 and is squirted onto the scrim layer 123 by the one or more nozzles 432. This layer of heated compound is shown as compound layer 124 in FIG. 3. The scrim 123 and compound 124 layers pass underneath a squeegee 434 to evenly distribute the compound layer 124 over the scrim layer 123. The squeegee 434 may also press the semi-solid compound layer 124 into the scrim layer 123. Optionally, an additional set of rollers may press the layers 123 and 124 together to form a cohesive layer of both scrim 123 and compound 124. The compound 124 and scrim 123 layers then pass through oven 440 to set the semi-solid compound layer 124. The underlayment is baked at a set temperature and passed through the oven 440 at the speed of assembly line belt, causing the compound 124 and scrim 123 layers meld together into the scrim and compound layer 127, shown in FIG. 3, and transition to a solid state.

After passing through the oven 440, a vapor barrier 126 unrolled from the roll 420 and tensioned by the rollers 422 is combined with into the scrim and compound layer 127 by the sandwich rollers 452. The now "complete" underlayment 120 then passes over a strong high powered magnet(s) roller 450, which may comprise Neodymium Iron Boron (NdFeB or NIB), Samarium Cobalt (SmCo), Alnico, Ceramic or Ferrite, or Super Magnet type magnets. In another embodiment the powered magnet roller 450 may be a pulse magnetizer. The alloy powder that is trapped in the now solid raw materials of the compound 124 and scrim 123 layers is polarized by passing over the magnetized rollers 450. This complete and magnetized underlayment 120 may then be rolled up and/or modularized.

Figure 5:
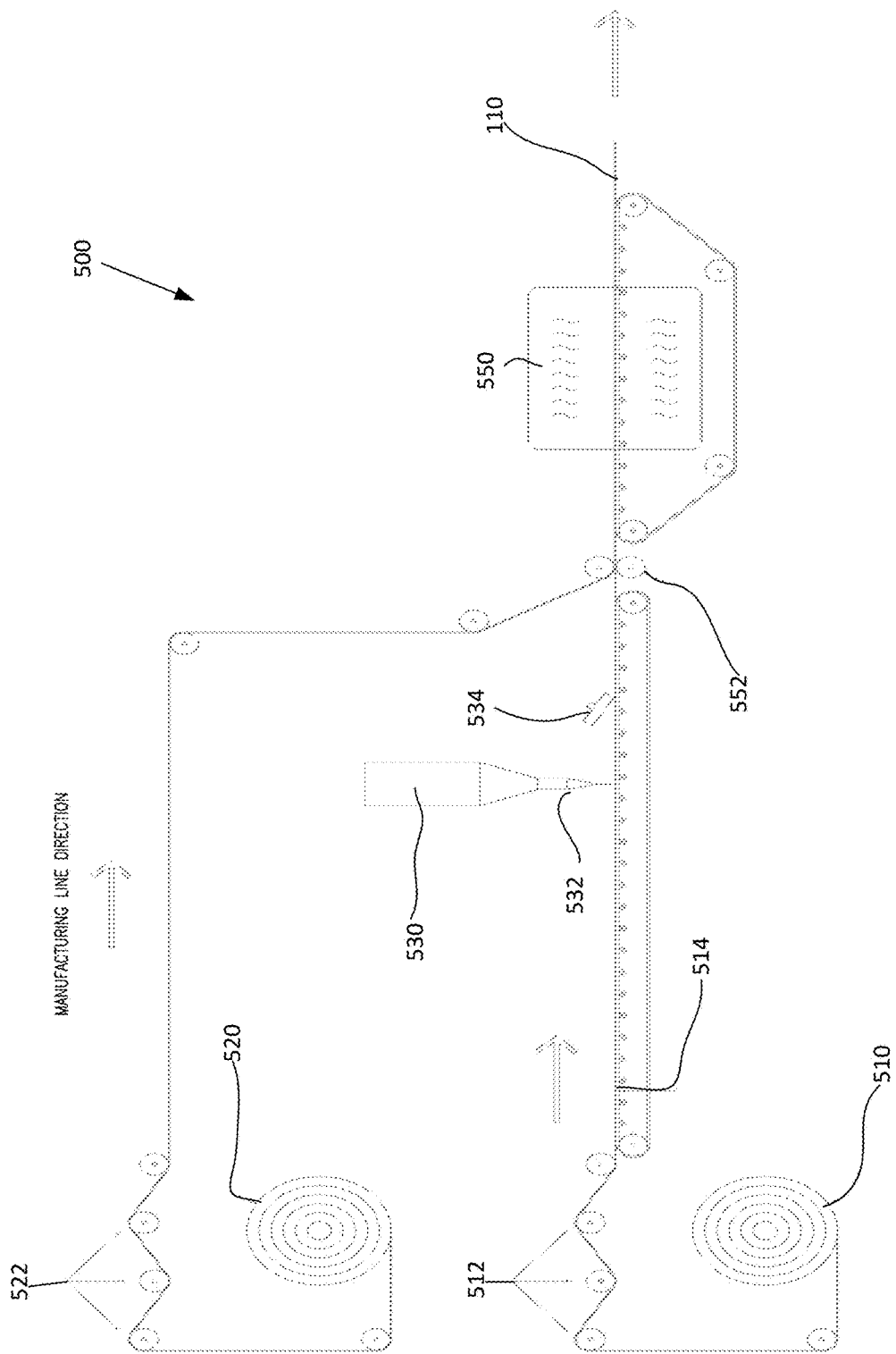
FIG. 5 is a simplified view of an embodiment of the process for manufacturing a magnetized carpet layer of the present invention.

With reference now to FIG. 5, an embodiment of the process 500 for manufacturing a magnetized carpet layer 110 is provided. First, a bonding agent is created by first blending either a proprietary or standardized blend of raw materials that may be either pelletized or powered or both in the hopper 530. The type of materials used may vary and depends on the intended use of the carpet but may include PVC, polypropylene, rubber, fiber glass, graphite, and various other compounds. A metallic alloy component is also added to the compound blend. The alloy component may be any iron, steel, or other suitable ferro-magnetic compound. Carpet or modular carpet for the carpet layer 112 is typically tufted and further comprises a primary backing as part of the carpet layer. Initially, the carpet 112 comprises the tufted fabric with a primary backing. The carpet enters the manufacturing line pre tufted and may be on a 12' or 15' roll 520. The carpet 112 is unrolled from the roll 520 is put through a series of rollers 522 to be stretched out to the desired tension. This tensioning reduces the likelihood of wrinkles forming in the finished carpet 110 when the secondary backing or scrim layer 114 is bound to the tufted fabric and primary backing of the carpet layer 112.

At the same time as the tufted fabric 112 is being tensioned by rollers 522, a scrim layer 114 is unrolled from a roll of scrim tape 510, which may comprise a fiberglass scrim tape, and tensioned by rollers 512. The pellet and powder mix described above is also blended and heated in the hopper 530 to form a semi solid compound that may have a viscosity and consistency similar to a caulking material. The fiberglass scrim tape 114, which is under a tension force and stretched flat on the assembly line 514, is constantly moving at a set forward speed through the assembly process.

The blended semi solid compound is squirted out of one or more nozzles 532 directly into a compound layer 116 onto the fiber glass scrim tape 114 and subsequently squeegeed by squeegee 534 to a desired height and thickness. The squeegeeing process may be guided by a set of edge dividers. The squeegeeing process causes the semi-solid compound 116 to join with and be pressed into the fiberglass scrim tape 114, forming a single fiber tape and semi-solid compound layer 115. This fiber glass scrim with the semi-solid compound layer 115 is then compressed beneath the tufted fabric layer 112 by a series of rollers 552 forming a sandwiched layer of tufted fabric and primary backing 112, semi-solid compound 116, and fiberglass scrim tape 114. After these components have been joined or bonded together by rollers 552, the layers are baked in an oven 550 at a constant temperature while still being moved along the assembly line.

The process 500 combines the alloy into the backing of the finished floor covering unit 110. However, after the baking in the oven 550 in the process 500, unlike after the baking in the process 400, the carpet layer 110 would not pass over a high powered magnet like magnet 450. After the baking process, one or more coatings may be applied to the now finished backing system and carpet roll. The finished product 110 may be kept in a roll or it could be cut into modular floor covering units. After the compression and baking stages of the process, the now finished carpet moves 110 may be laser cut. The cut carpet may also be buffed on the edges to remove the stray tufts of fabric and bits of scrim or "fuzzies" from said cut carpet.

In another embodiment, the underlay 120 or primary backing 112 and semi-solid compound 114 may be produced as a sheet of material that may be hot-pressed or otherwise combined with a top layer to produce a magnetic underlayment layer or magnetically receptive layer that may be applied to or combined with any other layer. In this embodiment the underlayment layer or magnetically receptive layer may be produced by a calendering method. A calender is a device used to process a polymer melt into a sheet or film. The same method may be used to make a magnetically receptive layer.

The calendar disperses a heat softened polymer (e.g., rubber, PVC) between two or more rollers to form a continuous sheet. To begin the process a polymer is first blended and fluxed. Blending is a process that creates the desired polymer and fluxing heats and works the blended polymer to a desired consistency. The polymer is then processed through the calender and is extruded at a thickness determined by the gap size between a final set of rollers. The final set of rollers also determine the surface finish (e.g., glossy, textured). A double sided peel and stick layer or other adhesive layer may also be added to the underlayment layer or magnetically receptive layer produced by the calendaring process. A cushion or other insulating layer may also be attached to the underlayment layer or magnetically receptive layer produced by the calendaring process. The underlayment layer or magnetically receptive layer produced by the calendaring process may be combined with another layer in a method similar to that shown in FIGS. 4 and 5.

When the calendering method is used to produce a magnetic underlayment a blend of materials that may be magnetized must be added to the polymer mixture prior to forming the layer. One of iron powder, iron granules, steel granules, steel powder, anisotropic powder, isotropic powder, or strontium ferrite powder may be added to the polymer mixture. After the calendered layer is formed it may be magnetized. The calendered layer may then be magnetized by a pulse magnetizer or by a set of magnetic rollers.

Figure 2:
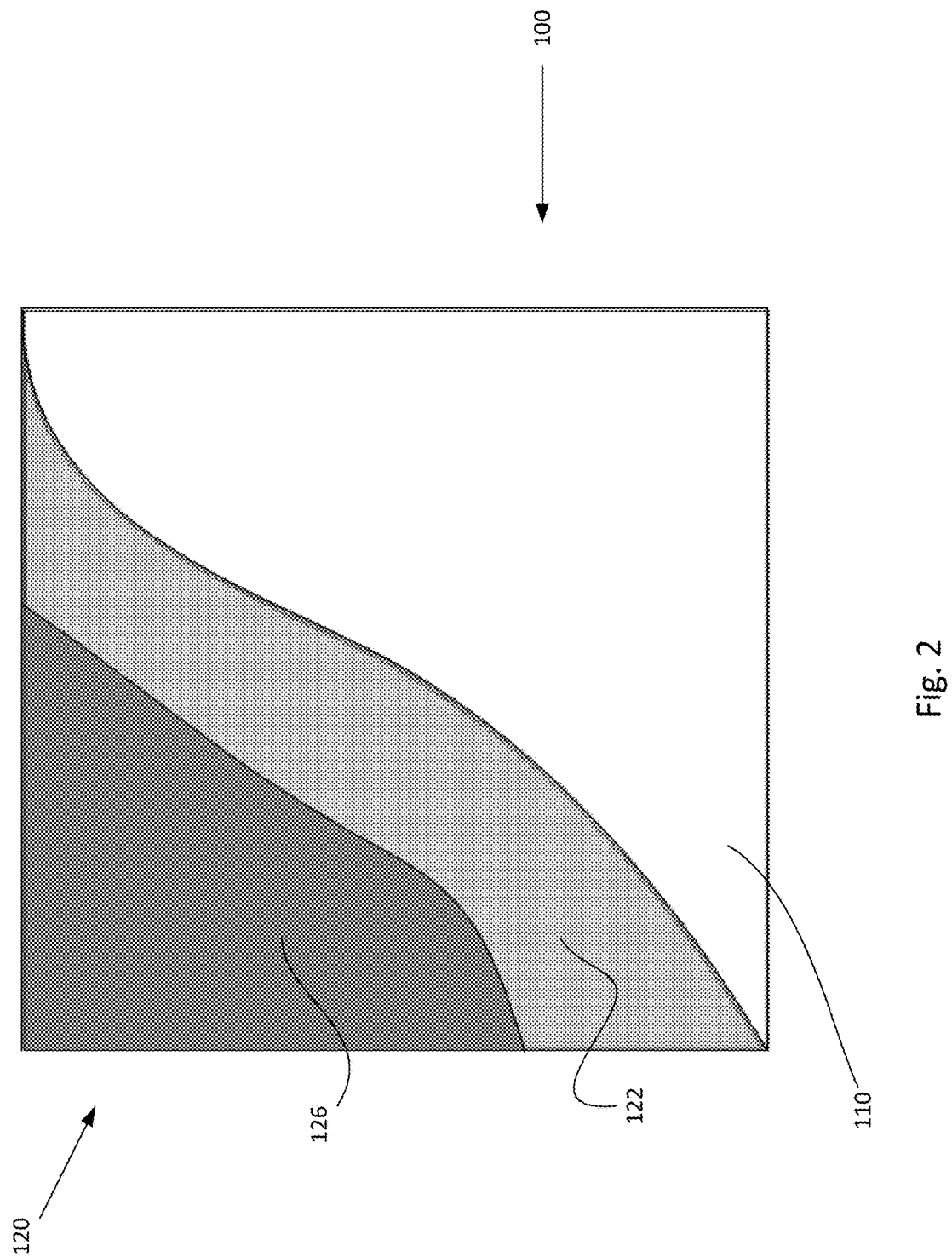
FIG. 2 is a cutaway plan view of an embodiment of a carpet layer and magnetic underlay of the present invention.

With reference to FIGS. 1 and 2, a method for installing the modular floor covering 110 using the magnetized underlayment 120 on a subfloor may be as follows.

The underlayment 120 would first be placed on the subfloor. The underlayment 120 may either float, that is not be secured, or may be directly glued to the subfloor. The vapor barrier 126 would be placed closest to the subfloor with the magnetized scrim layer 122 facing upwards, away from the subfloor. The carpet layer 110 with the embedded magnetically attractant layer, which may either be a rolled carpet layer or a set of modular flooring units, is placed or laid over the underlayment 120. Because of the alloy powder in the backing on the carpet layer 110, the carpet layer 110 will be significantly magnetically attracted to the underlayment 120. In this way the finished flooring 100 will not have to be seamed at all. The installation method according to present invention eliminates the need to seam (or hold in place) the carpet layer 110, which may be either modular flooring units or longer rolled goods carpet.

Installing a carpet layer 110 using the magnetized underlayment 120 provides several benefits over the prior art. First it solves the problem of curling floor tiles and broadloom. The carpet layer 110 will always lay flat due to the magnetic attraction between the underlayment 120 and the carpet layer 110. There will be no need to "seam" two pieces of carpet layer 110 together regardless of whether the carpet layer 110 is a modular floor covering unit or broadloom rolled goods carpet. With sufficient magnetization, the carpet layer 110 will resist tension forces from foot traffic, furniture, machinery, etc. on three axes.

This manufacturing method may be used for most floor covering applications and is not be limited to carpet based floor covering units. This same method with small variations may be used with, for example, magnetized underlayment and vinyl flooring; the powdered alloy may be applied to the backing or it may be added to the vinyl blend during the manufacturing process. A plasticizer or other compound or chemical may be added to the compound layer to enable the compound layer to either stick to or be embedded in the floor covering unit. This system may also be used in vinyl composition tiles (VCT), luxury vinyl tile (LVT) or luxury vinyl plank (LVP) tiles, as well as other various floor covering units including ceramic tiles, stone tiles, hardwood, laminate wood, engineered hardwood, and porcelain tiles. A similar modified method may also be used to manufacture hardwood floor coverings with an embedded magnetic or magnetized compound or with a magnetic or magnetized backing. A magnetic or magnetized compound or backing as described herein may be applied to any suitable floor covering. These non-carpet floor coverings with magnetic layers, backings, or embedded compounds may be installed in a manner similar to that used for installing carpet floor coverings.

Figure 6:
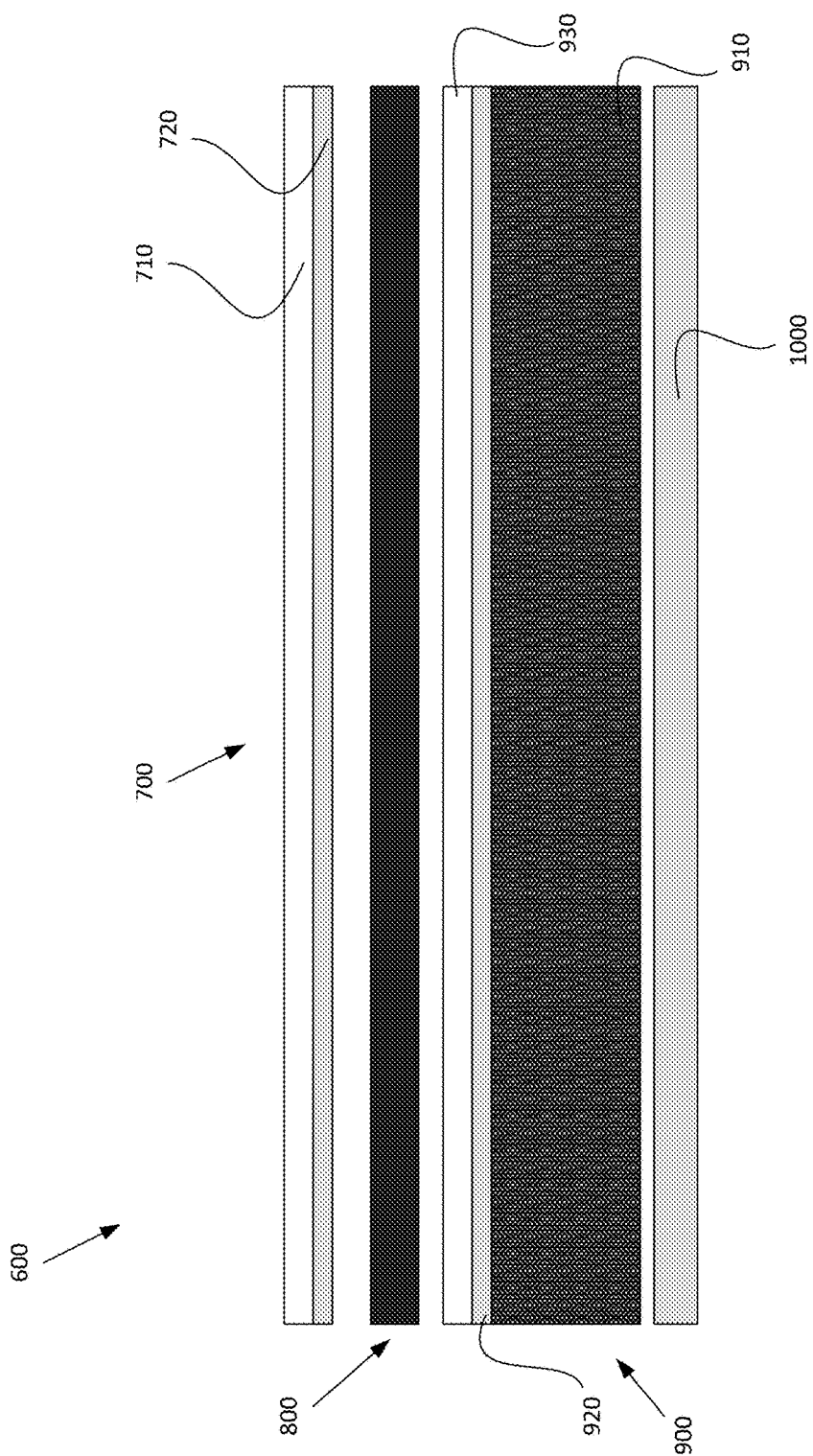
FIG. 6 is a side cross-section view of an embodiment of a wall frame, support layer, magnetic underlayment, and wall covering unit of the present invention.

With reference now to FIG. 6, a side cross-section view of an embodiment of a modular magnetic wall covering system 600 comprising a wall frame 1000, support layer 900, magnetic underlayment 800, and wall covering unit 800 of the present invention is provided.

The modular magnetic wall covering system 600 may use a support layer 900 comprising a wall board 910 that does not need to be finished and also does not need to be made from Gypsum. The wall board 910 of the present invention may be comprised of a lighter, thinner, board, which in a preferred embodiment is comprised of mineral wool. Mineral wool is a premium insulation product—made from volcanic rock melted at high temperatures and spun into a mat or batt of fine fibers. Mineral wool only burns at temperatures in excess of 850 Celsius so in effect is very resistant to fire and provides a fire barrier for a roof, walls, or floor. A mineral wool wall board 910 dramatically increases the fire rating and the R value for insulating and acoustics over a traditional gypsum drywall board. The support layer 900 does not have to be finished like a drywall board would. Because of this, the support layer 900 may comprise different materials than a typical drywall board. The support layer 900 may comprise a wall board 910 which may comprise mineral wool, a cover layer 930 which may comprise a fire retardant webbing, and an insulation layer 920 which may comprise acoustic dampening raw material sheeting. The cover layer 930, insulation layer 920, and wall board 910 may be incorporated into one sheet as a support layer 900 because the support layer 900 does not need to be the "finish coat" like drywall which must be hung, finished, primed, textured and then finally painted.

The magnetic underlayment 800 is disposed between the support layer 900 and the wall covering unit 700 and abuts the cover layer 930 of the support layer if one is used or the wall board 910 if no insulation layer 920 or cover layer 930 are used. The magnetic underlayment 800 may be attached to the wall board by a fastener, such as nails, stapes, screws, or clips, or by adhesives such as glues, silicone adhesives, etc. The magnetic underlayment may also be fastened to the support layer 900 and/or the wall frame 1000 by a fastener device 1100 shown in FIG. 7. The magnetic underlayment 800 may be anisotropic or isotropic magnetic sheeting. The magnetic underlayment 800 is applied over the support layer 900. Optionally, the magnetic underlayment 800 may be incorporated into the support layer 900 in a single board removing the need to separately attach, hang, or affix the magnetic underlayment o the support layer 900. The support layer 900 and magnetic underlayment 800 together as a single board have a high R value and substantially reduce unwanted noise pollution and echo.

In the support layer 900, mineral wool with a hardening additive such as fiberglass may be used to give the board comparable stiffness to a gypsum board. Not only does mineral wool have desirable acoustic properties, but the magnetic underlayment 800, which may comprise anisotropic powder for stronger magnetic remanence, but may be isotropically independent to the magnetically receptive material, is an additional sound barrier in the system. Mineral wool is an inert material and provides many advantages when used in building construction. Mineral wool insulation may be made from basalt—an igneous rock.

A support layer 900 primarily comprised of mineral wool or slag wool would eliminate most mold and/or moisture issues that result from trapped moisture under flooring materials. In high rise construction, currently wall construction cannot begin until the building has been hung with the exterior glass and cast materials. This is because of problems that exist with typically used gypsum based walls. Furthermore, dehumidifiers and/or heaters must be brought into the building process for gypsum walls in the winter/summer to remove the conditions that allow for mold growth and provide the ability to allow the seaming of the gypsum boards to dry in an acceptable time frame. The ability to work on the inside of a building before the outside of the building is finished using a mineral wool support layer 900 will result in time and monetary savings in construction.

The outer layer is the wall covering unit 700 which is the "finish coat". The wall covering unit 700 may be manufactured in a manner similar to a resilient flooring product. The wall covering unit 700 may have an attractant layer 720 hot pressed as a backing to a decorative surface layer 710. The top layer or outer layer of the modular magnetic wall covering system 600 is the decorative surface layer 710, the "Décor" layer. The decorative surface layer 710 may be made to imitate the appearance of any surface or covering type. The finish of the decorative surface layer 710 may be virtually any finish as desired by the end user such as tile, plaster, wood, slate, granite, flat or matte color, wall paper, Venetian plaster, traditional wainscoting and trim wood, brands, art etc. Since there is no traffic on the modular wall covering unit 700, it may be manufactured thinner than a similarly sized modular floor covering unit.

Figure 7:
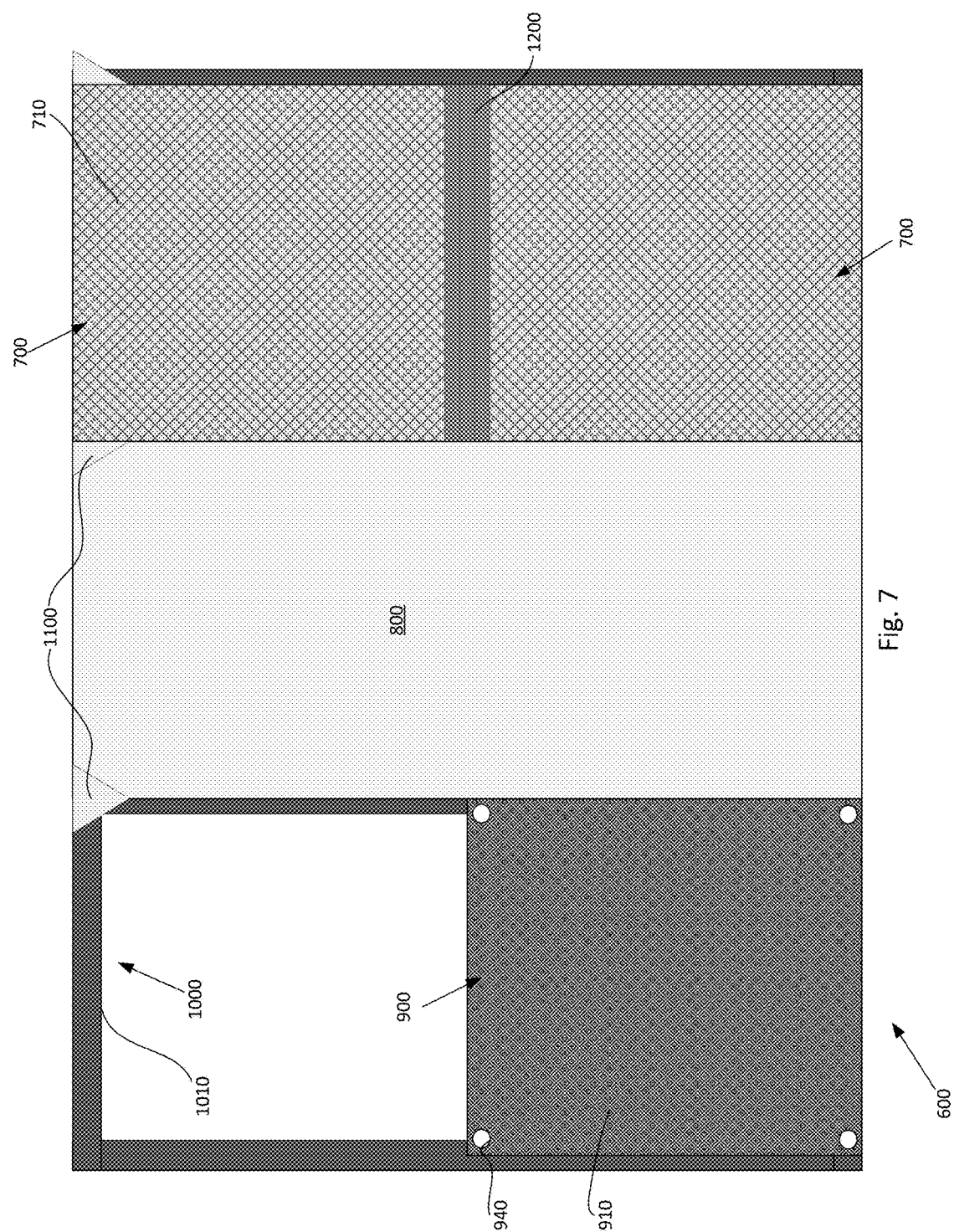
FIG. 7 is a front view of three phases in the installation process of the present invention.

With reference now to FIG. 7, a front view of three phases in the installation process of the modular magnetic wall covering system 600 of the present invention is provided. The wall frame 1000 comprising a set of wood, metal, or plastic frame members 510 is the support structure for the modular magnetic wall covering system 600. A support layer 900 comprising only a wall board 910 is secured to the frame using fasteners 940 which may be screws, nails, staples, or other suitable fastening means. The magnetic underlayment 800 is affixed to the support layer 900 and would be disposed on the front of the surface layer 900 and behind the back of the modular wall covering units 700. As described herein, the magnetic underlayment may be affixed to the support layer 900 by fasteners such as fastening units 600 or by adhesives. Fastening units 1100 may be preferred over adhesives to provide additional support for the weight of the magnetic underlayment 800 and wall covering units 700 to prevent sagging or drooping. The wall covering units 700 with decorative outer layers 710 may be placed on the magnetic underlayment 800 after the magnetic underlayment 800 is affixed to the support layer 900. Additional trim pieces such as trim piece 1200 may be used to hide seams, provide additional support, or provide decoration. The trim piece 1200 may be placed anywhere along the magnetic underlayment 800 including at the middle as a wainscoting or chair rail, at the top as a crown molding, or at the bottom as a baseboard.

The modular magnetic wall covering system 600 of the present invention is not limited to being used on boards such as the support layer 900 or in new construction. The modular magnetic wall covering system 600 of the present invention may be used on any suitable magnetic underlayment 800. The magnetic underlayment 800 may be installed on existing wall boards such as drywall or on ceilings or other existing walls or surfaces. For example, a magnetic underlayment 800 may be installed on the collapsible walls of a convention center divider or above doors, openings, or walkways. A wall covering unit 700 could then be easily placed and removed on the magnetic underlayment 800 as desired.

Figure 8:
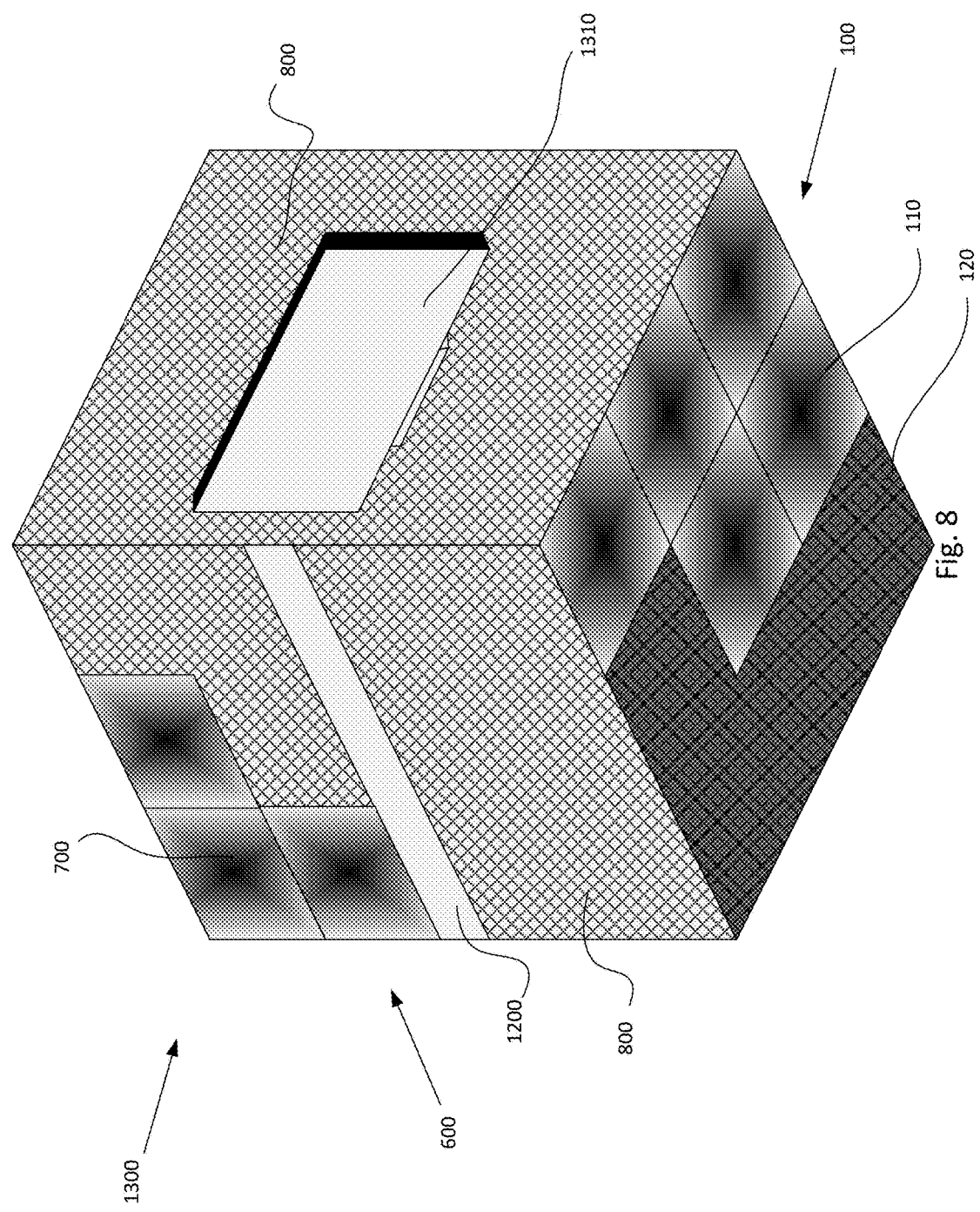
FIG. 8 is a perspective view of in interchangeable box system comprising modular floor and wall covering units according to the present invention.

With reference now to FIG. 8, a perspective view of a room having an interchangeable box system 1300 is provided. The interchangeable box system 1300 combines features of the wall covering system 600 and modular floor covering 100. The magnetic underlayment 800 on the walls is adapted to receive wall covering units 700, trim pieces 1200, and may also be adapted to mount additional fixtures such as television 1310 either directly or by a frame or other supporting structure affixed to the television and magnetically secured on the underlayment 800. The floor of the interchangeable box system 1300 comprises the underlayment 120 and a set of floor covering layers 110. A room implementing the interchangeable box system 1300 may have any aspect of the floors or walls changed and redecorated with minimal effort and would not require demolition or tear down of existing decorations or fixtures. To construct a room with the interchangeable box system 1300 a support layer 900, shown in FIG. 7, would be attached to a wall frame. The magnetic underlayment 800 could be attached to the support layer, the support layer could be impregnated with a magnetic component, a magnetic underlayment 800 could be laminated to the exterior of the support layer 900, or the support layer 900 could be fully coated in a magnetically attractive coating. Wall covering units 700, trim pieces 1200, and other fixtures may then be magnetically, semi-permanently, and releasably secured to the magnetic underlayment 800. The underlayment 120 for the modular floor covering 100 may be secured to a supporting surface as described hereinabove. Floor covering units 110 may then be placed on the underlayment 120. Additionally, a magnetic underlayment may be attached to a ceiling in a similar manner to the underlayment 800 on the walls. Ceiling tiles may be secured to the ceiling underlayment in a similar manner to the wall covering units 700.

The magnetic underlayment 800 and underlayment 120 may have the following properties: thickness of 0.060 inches (1.52 mm), hardness of Shore D60, specific gravity of 3.5, a shrinkage 1.5% caused by heating at 158 F for seven days, tensile strength of 700 psi (49 Kg/cm^2), and may have parallel poles (north south) along the length at 2.0 mm intervals. The floor covering unit 110 and wall covering unit 600 may have a magnetically isotropic receptive material laminated onto the surface to be placed on the underlayment 120 or magnetic underlayment 800 respectively while the underlayments may either use an anisotropic or istropically magnetized flexible layer laminated onto or incorporated in the underlayment at the time of manufacture. Specifically, the manufacturing process described above in FIGS. 4 and 5 may use pulse magnetization to isotroprically magnetize the underlayment 120 or magnetic underlayment 800. Pulse magnetization utilizes a coil and a set of capacitors to create short "pulse" bursts of energy to slowly increase the magnetic field and to completely penetrate the underlayment 120 or magnetic underlayment 800. The pulse magnetization may also be used to anisotropically magnetize the underlayment 120 or magnetic underlayment 800 if desired.

If the magnetically attractive layer is incorporated into the underlayment 120 or underlayment 800, a dry mixture of strontium ferrite powder and rubber polymer resin (e.g., rubber, pvc, or other like materials to make a thermoplastic binder), is mixed, calendered and ground then formed by a series of rollers to give it the correct width and thickness. The material is then magnetized on one side only as shown above in FIG. 4.

The magnetic performance of bonded magnets is limited by the amount of polymer used (typically between 20-45% by volume) as this significantly dilutes the remanence of the material. In addition, the melt-spun powder has an isotropic microstructure. The dilution effect is overcome by incorporating an anisotropic magnetic powder. By inducing texture in the magnetic powder or milling it to a fine micrometer-scale particle size, and then preparing the magnet in an aligning field, the bonded magnet can then have an enhanced remanence in a particular direction. In the present invention, the magnetic underlayment, such as underlayment 120 or underlayment 800, is magnetized directionally to give it a stronger remanence. However, the magnetically receptive sheeting is not pole oriented and therefore does not need to be oriented in any one direction. The optimal temperature range for long term durability of the underlayment 120 or underlayment 800 is from 95 C to −40 C.

For an extruded flexible magnet, the flexible granular material is heated until it begins to melt and is then forced under high pressure using a screw feed through a hardened die which has been electrical discharge machine (EDM) wire eroded to have the desired shape of the finished profile. Flexible magnets can be extruded into profiles which can be coiled into rolls and applied or combined as shown in FIGS. 4 and 5. The non-magnetized face of a flexible magnet may be laminated with a double sided adhesive tape, or laminated with a thin vinyl coating so that a printed layer may be applied. An attached cushion may also be applied for flooring purposes. Anisotropic permanent flexible magnets may have a Residual Magnetic Flux Density (Br) of T(G): 0.22 to 0.23 or (2250-2350) and a Holding Power (BHC) of 159 to 174 kA/m or 2000-2180 (Oe) while Isotropic permanent flexible magnets have a residual magnetic flux density (Br) of 0.14 to 0.15 T or 1400-1550 (G) and a holding power (BHC) of 100 to 111 kA/m or 1250-1400 (Oe). An Anisotropic permanent flexible magnet may be 40% stronger in magnetic remanence then an Isotropic one.

For the floor covering units 110 and wall covering units 700, the magnetically receptive material of the attractant layer 720 or semi-solid compound 116, shown in FIGS. 6 and 3 respectively, may have the following properties: a thickness of 0.025 inches (0.64 mm), a hardness of Shore D60, a specific gravity of 3.5, a shrinkage 1.5% caused by heating at 158 F for seven days, tensile strength of 700 psi (49 Kg/cm^2), and a hold strength of 140 grams/cm^2.

In the interchangeable box system 1300 all components are "quasi" permanently secured to the underlayment. Due to the immense surface area the magnetic resonance between the underlayment 120 or underlayment 800 and the floor covering unit 110 or wall covering unit 700, the materials have an extremely strong bond, making the installation "quasi" permanent. However, the bond may be broken by "catching" a corner and prying upwards to break the bond, thereby allowing the floor covering unit 110 or wall covering unit 700 to be changed on demand, something currently unavailable with any existing technology. In the interchangeable box system 1300, any building material with a flat backing (for optimal magnetic remanence) can be utilized in this system. A floor covering unit 110 made from wood, for example, may also be utilized as a wall covering unit 700 or vice versa.

The ability to remove any piece at any given time during the construction process is highly desirable. If a wall panel 700 in the interchangeable box system 700 does not match correctly or needs to be trimmed, as may be the case in many installations, one can simply remove a wall piece 700 and reattach on demand with no abatement.

In the Flooring industry, the prevailing method of seaming a rolled carpet requires affixing a tack strip on the perimeter of the room, hot melt taping the seams and stretching or "tensioning" the rolled floor covering to keep the product in place. This allows for product failure by the actual carpet delaminating due to tension (primary backing of the flooring pulling away from the secondary backing), heat distortion of the finished goods, peaking of the seam, etc. There are many ways that the conventional method can fail. The system 1300 eliminates all of these failures and eliminates the need for tackstrip, as the floor covering unit 110 no longer has to be tensioned. Magnetic remanence due to immense surface area, prevents the floor covering unit 110 from "peaking" or moving under stress.

In the event that an existing wall or a new construction wall has a defect; such as a bow or concave limiting magnetic remanence, one could simply use a double sided magnetically receptive and magnetic backed shim to alleviate the problem as an accessory to the interchangeable box system. The floor covering units 110 and wall covering units 700 can provide different designs, logos, textures, colors, acoustic properties, reflective properties, or design elements in a room. The floor covering units 110 and wall covering units 700 may also incorporate corporate or other branding or sponsorship information and may be used for advertising or as signage. Homeowners, business owners, or designers may change out any aspect of any room using the interchangeable box system 1300 on demand at any time.

The flexible nature of the interchangeable box system 1300 would also provide benefits in the film, television, and theatre industries. In these industries, TV sets, movie sets and the like are built in a modular fashion and typically emulate a real location in a more cost effective manner. Unfortunately these sets are built for their specific use on a frame and then that frame must be stored for another "like" use of the same set or a new set must be built each and every time to suit the scene. With the interchangeable box system 1300, it would be highly cost effective and highly beneficial to change the scene of a room on demand utilizing the same frames. It is also cost effective in large studios that must have a western town set for a first scene and then a New York City set for another scene. The ability to use the same frames but change the wall coverings 700 and floor covering units 110 to simulate what is needed would be desirable and cost effective.

With reference now to FIGS. 9 to 14, several additional embodiments of the present invention are provided.

Figure 9:
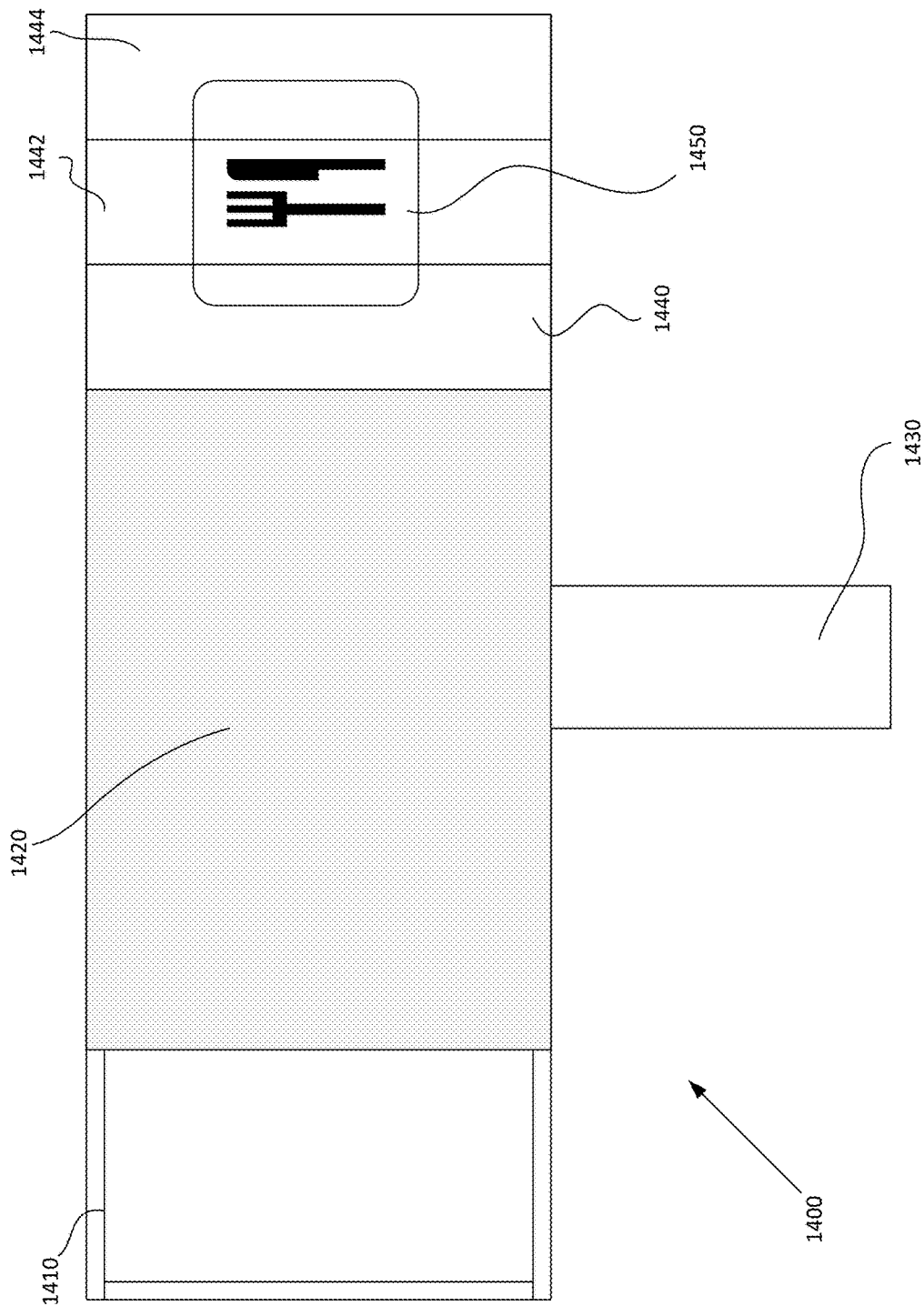
FIG. 9 is a front view of a billboard having a magnetic layer and a plurality of modular decorative panels according to the present invention.

FIG. 9 provides a front view of a billboard 1400 having a frame 1410 supported by a support pillar 1430. One or more magnetically attractive panels 1420 are secured to the frame 1410. A plurality of modular magnetic decorative panels 1440, 1442, and 1440 may be installed on the magnetically attractive panels 1420. The magnetically attractive panels 1420 may be constructed in a manner similar to the support panels 900 and magnetic underlayment 800 described above and the modular magnetic decorative panels 1440, 1442, and 1440 may be similar to the wall panels 700 or modular floor covering units 110. When the modular magnetic decorative panels 1440, 1442, and 1440 are placed on the attractive panels 1420 a design or designs 1450 will be formed from the outward face of the modular magnetic decorative panels 1440, 1442, and 1440. In a typical billboard, poster panels are pasted onto a billboard frame. Once an advertising campaign is finished or the panels need to be changed, the poster panels are covered with the next advertisements image. Hand-painted billboards are painted on plywood panels that are secured to the frame. Once the campaign is complete, the plywood panels are whitewashed in preparation for the next design. Replacing designs or images on existing billboards is time consuming and expensive and requires constant maintenance. The billboard 1400 of the present invention provides a magnetic interchangeable system that allows a stronger bond using magnetic remanence. A flexible magnetic sheeting can be adhered to an underlying substrate, laminated to the substrate as one board or any other suitable configuration to form the panels 1420. A flexible magnetically receptive sheeting with and adhered printable vinyl or other suitable material comprise the modular magnetic decorative panels 1440, 1442, and 1440.

The strong magnetic remanence provided by the present invention reduces the possibility of failure due to the strength of the magnetic bond. The billboard 1400 may also incorporate LED, OLED, LCD, or electroluminescence embedded in the thermoplastic binder of the modular magnetic decorative panels 1440, 1442, and 1440 and controlled by a controller board in the billboard 1400. This could enable spot lighting and sequencing of artwork, logos etc. in the modular magnetic decorative panels 1440, 1442, and 1440.

Figure 10:
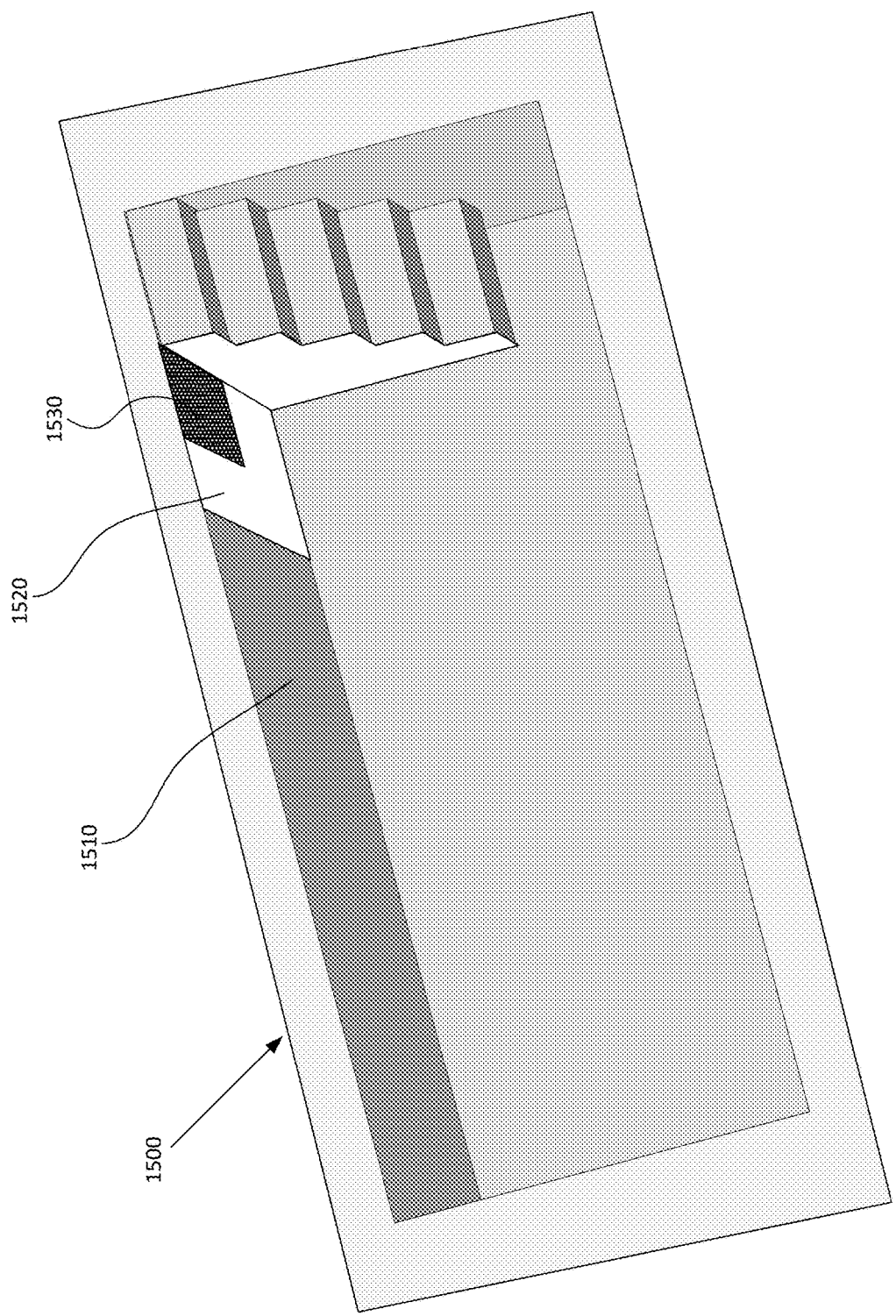
FIG. 10 is a perspective view of a swimming pool having a magnetic underlayment and a modular liner panel according to the present invention.

FIG. 10 provides a perspective view of a swimming pool 1500 having a magnetic underlayment 1520 and modular liner panels 1530 placed on the exterior surface 1510 of the pool 1500. A ferrite material encased in a polymer binder may also be added into the structure of the exterior surface 1510 to eliminate the need for a magnetic underlayment 1520. In this configuration the liner panels 1530 would need to be magnetically attractive. The magnetic underlayment 1520 may either be laminated into the surface 1510 itself, or adhered as a lining. The panels 1530 could have magnetically receptive sheeting as the base layer of the flexible panel and may be made from printable vinyl or any other material. The panels 1530 could also have ferrite in the extruded mix trapped in a polymer to make the ferrite impervious to rust or any other configuration of materials. The panels 1530 may have designs that resemble traditional tile, patterns, brands, word art, or any other feature that a consumer would desire. The panels 1530 may also incorporate LED, OLED, LCD, or electroluminescence embedded in the thermoplastic binder.

Figure 11:
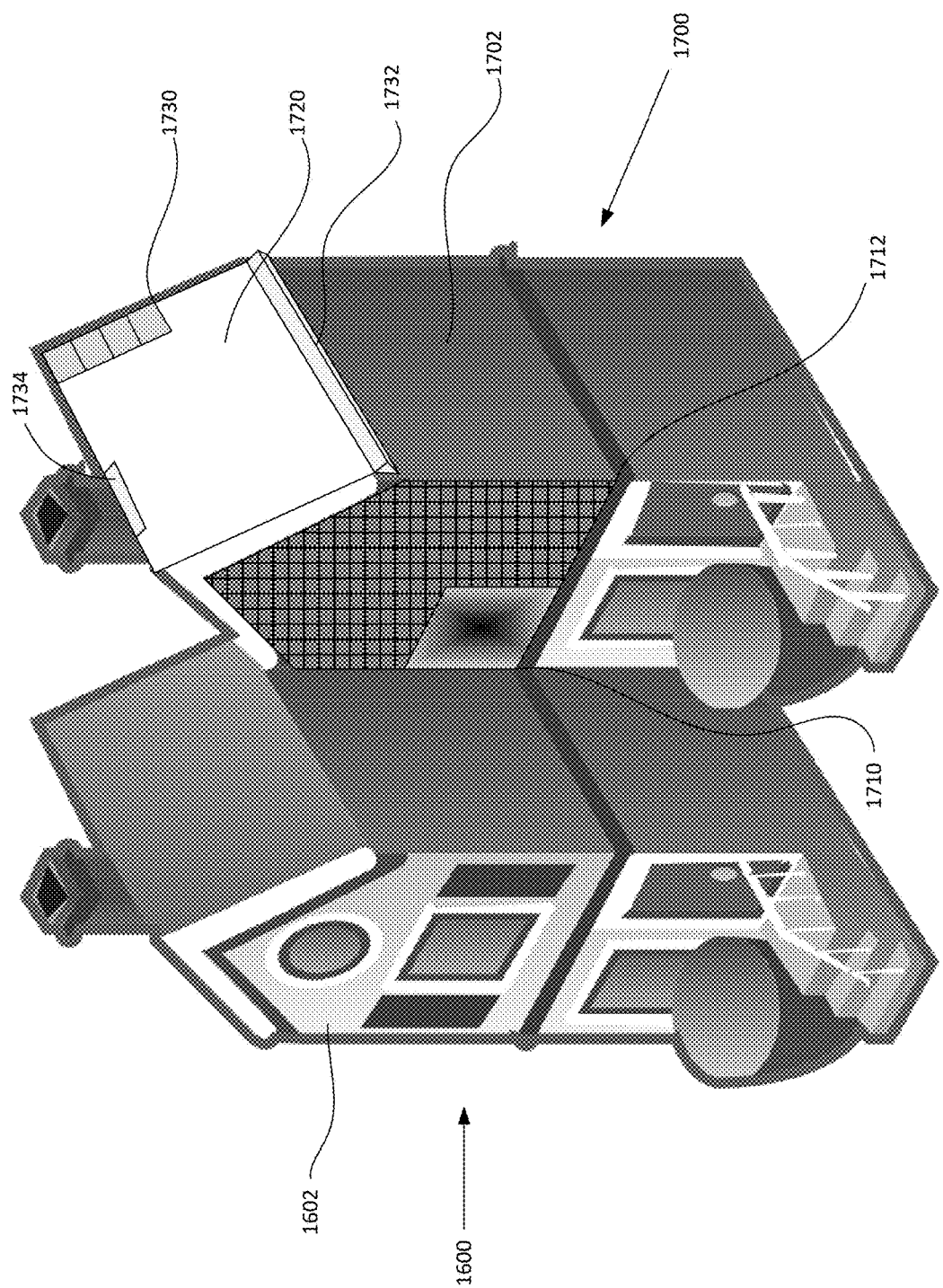
FIG. 11 is a perspective view of a typical row house and a row housing having modular magnetic wall and roofing panels according to the present invention.

FIG. 11 provides a perspective view of a typical row house 1600 having a standard exterior 1602 and a row house 1700 having an exterior 1702 with a modular front façade 1712 and modular roof 1720. One or more modular panels 1710 may be used on the modular front façade 1712. The panels 1710 may comprise a magnetically receptive layer and the façade 1712 may comprise a flexible magnetic sheeting attached to a support structure or may comprise a supporting surface with an embedded ferromagnetic layer. The modular roof 1720 may comprise a flexible magnetic sheeting attached to a support structure or may comprise a supporting surface with an embedded ferromagnetic layer. Roofing tiles 1730 may be magnetically secured to the roof 1720. Additionally, magnetically secured flashing 1734 and gutters or drain spouts 1732 may also be attached to the modular roof 1720. The roof 1720 may either comprise a magnetic layer adhesively secured to a substrate or a substrate layer having magnetic properties such as a mineral wool board with a magnetic coating. The magnetic layer or outer surface of the roof 1720 is water resistant because of the thermoplastic binder that encapsulates the strontium ferrite powder in the underlayment or finish coat. The magnetic sheeting thickness for the roof 1720 is determined based on the magnetic remanence desired. For example, a wind shear strength to withstand a category 5 hurricane before failure. A modular roof 1720, would be made from safer, environmentally conscious products and would be easy to recycle. Builders and users would be able to obtain "green" credits for a building system that is not only safer to construct (on the installation side) easier to install, easier to replace and cleaner for the environment, giving the end user endless choices for an overall cheaper product than is currently available.

Figure 12:
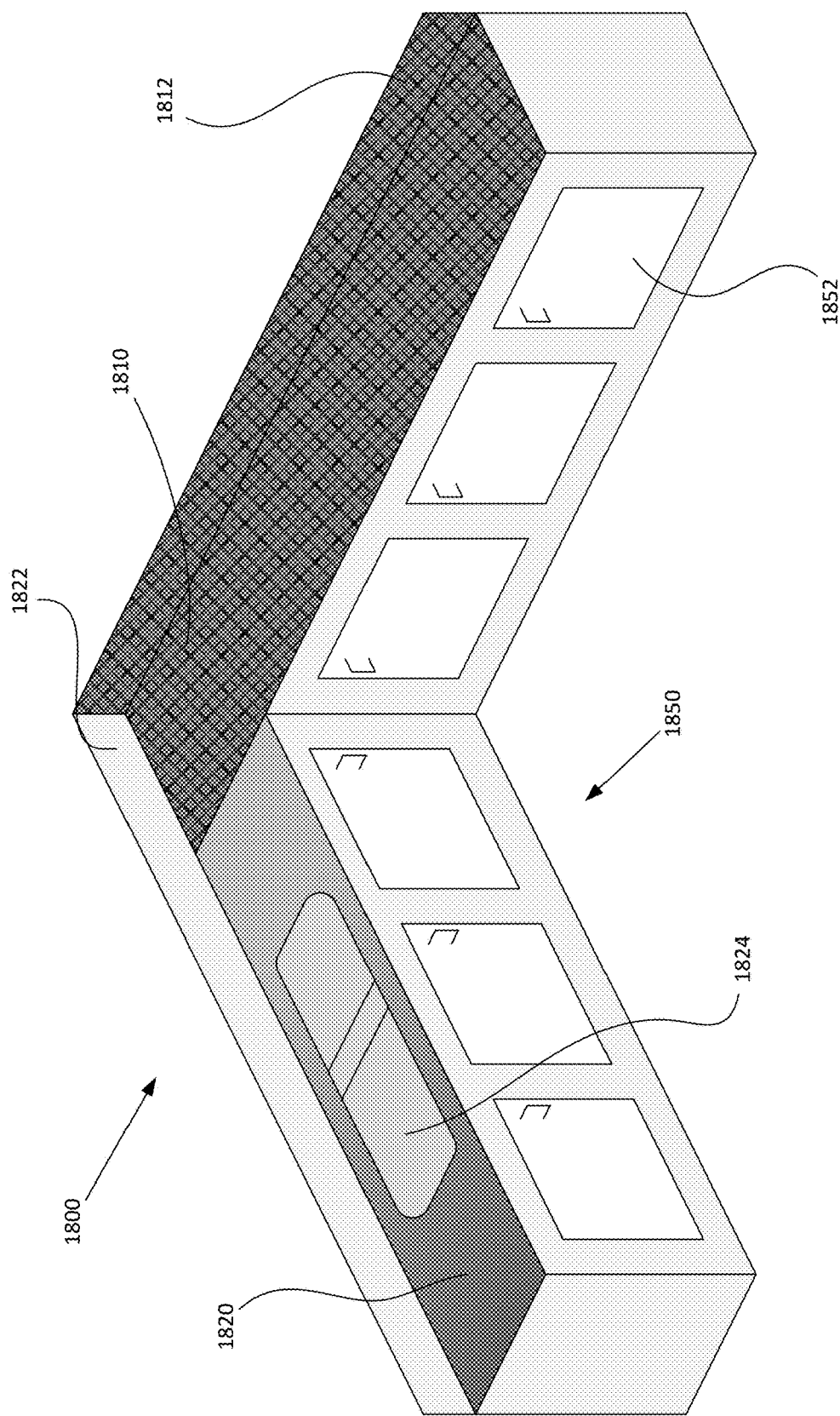
FIG. 12 is a perspective view of a cabinet installation having a magnetic layer for securing countertops having a magnetically attractive backing layer according to the present invention.

FIG. 12 provides a perspective view of a cabinet system 1800 having a magnetic layer 1810 for securing countertops 1820 having a magnetically attractive backing layer. The system 1800 may further comprise a magnetic layer 1812 for securing a backsplash 1822 and a plurality of cabinet doors 1852 that may have magnetically attractive layers on the exteriors of the doors. A sink cutout 1824 may be placed in the countertop 1820 and magnetic layer 1810. The top of the cabinets 1850 may be laminated with independently directional magnetic sheeting to form the magnetic layer 1810 as a one board system or the magnetic layer 1810 could also be glued independently of the substrate or any other configuration. If a tile product is used then the independently directional magnetic sheeting of the magnetic layer 1810 can be adhered to the top of the cabinets 1850 as one unit. If a ceramic tile product is used, a non-sanded grout (which would provide additional support to a tile countertop) can be used. When removal is desired for renovation or if breakage of a tile were to occur, a knife can be utilized to cut the non-sanded grout in between the tiles and the individual tile or the entire countertop 1820 can be removed in a simple, quick and nondestructive manner. A magnetically receptive sheeting can be applied to the backside of the countertop 1820, whether that layer is a solid piece of granite, a tile, Formica or any other material that constitutes a finished countertop. The magnetic bond will have enough magnetic remanence to hold tremendous weight in place because of the large surface. This enables the replacement of a countertop 1820 by only changing the countertop 1820 in a "nondestructive" way saving any underlying substrate(s) and cabinets 1850 from harm. The cabinet system 1800 enables an end user to modernize their countertops 1820 with minimal effort, saves a significant amount of time on installation and offers interchangeability, something not currently possible with the prevailing bonding and installation methods.

Figure 13:
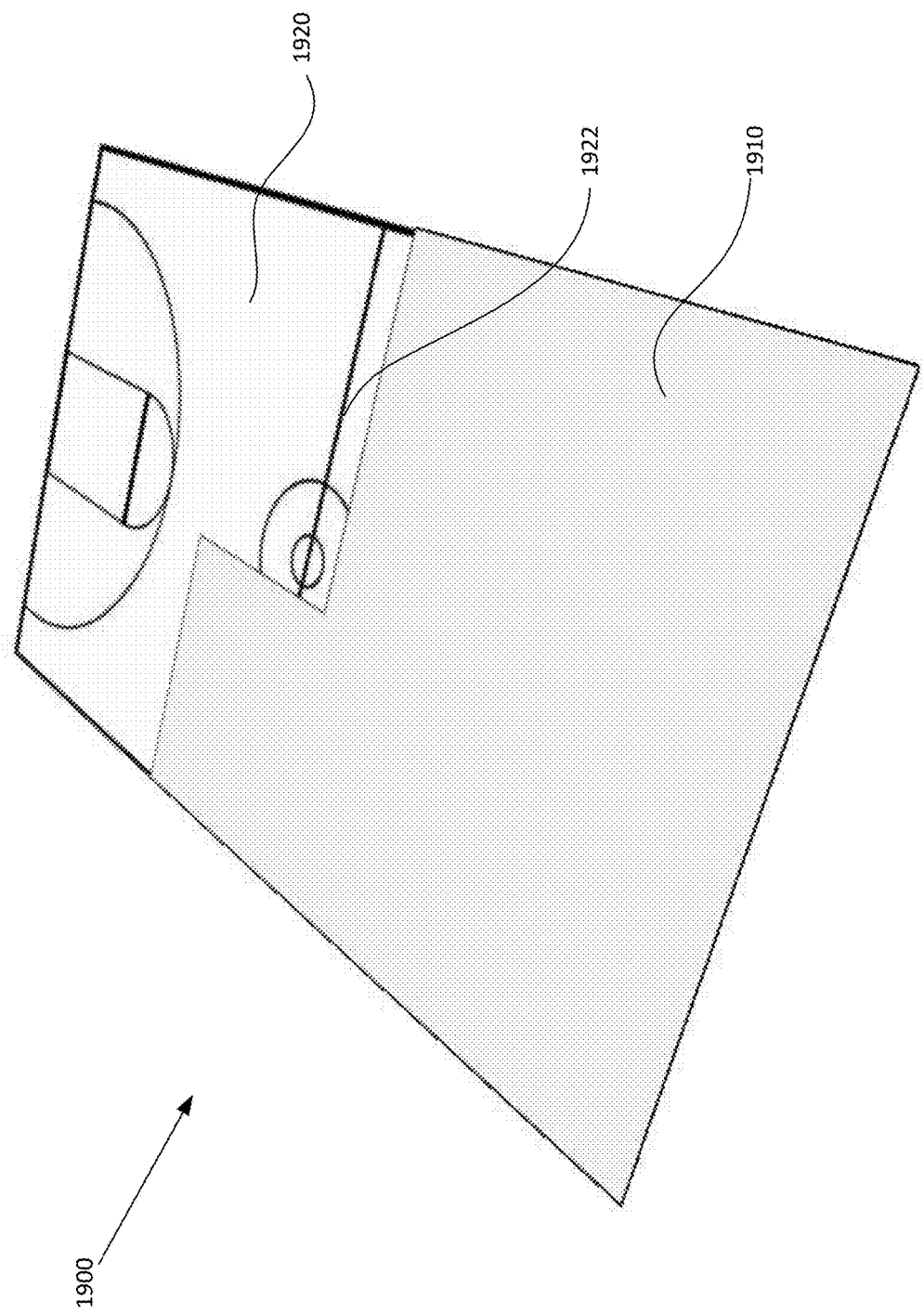
FIG. 13 is a perspective view of an athletic field having a magnetic underlayment and a plurality of modular floor panels according to the present invention.

FIG. 13 provides a perspective view of a modular athletic surface 1900 having a magnetic underlayment 1910 and a plurality of modular floor panels 1920 forming a floor pattern 1922. For example if a sports complex has a sports surface, they currently know the dimensions of that space. With a modular magnetic surface 1900, the same space could be utilized for multiple purposes. For example, the sports facility could have an indoor tennis court with the modular floor panels 1920 being a specific color, texture, brands, logos, word art, and lines all in a single rolled sheeting, much like a resilient flooring product or sheet good, or in a set of modular panels. When the area is finished for a given day or use, the floor panels 1920 could be rolled up or removed for storage and a completely new set of floor panels 1920 could be installed quickly for a basketball court for example or any other configuration desired. The ability to have a "quasi" permanent set of floor panels 1920 that can be changed to meet the demands of the desired facility would be highly beneficial. This athletic surface 1900 may also be rubberized for use in playgrounds or play areas.

Figure 14:
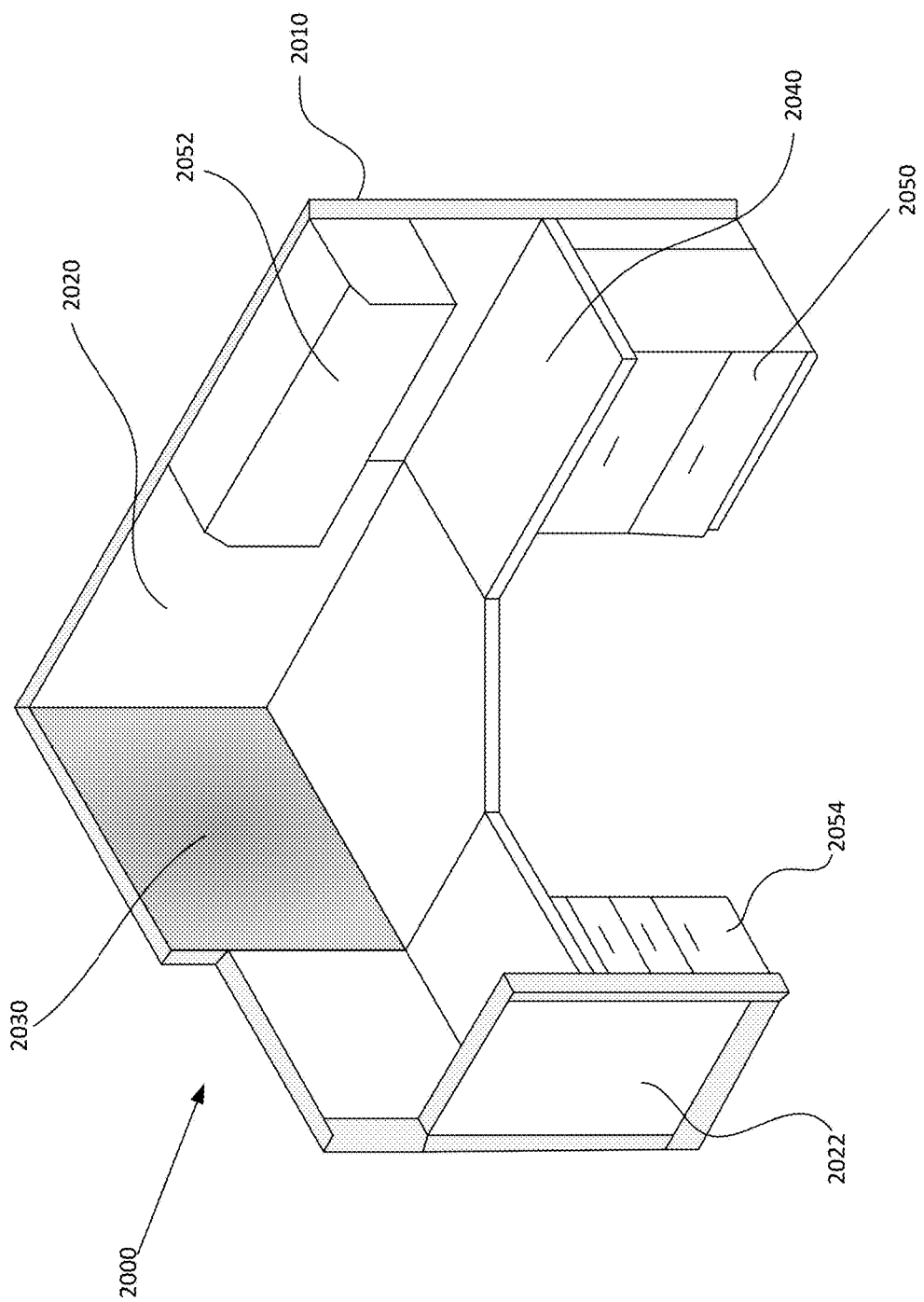
FIG. 14 is a perspective view of a cubicle having magnetically attractive wall panels and modular decorative panels according to the present invention.

FIG. 14 provides a perspective view of a cubicle 2000 having magnetically attractive inner 2020 and outer 2022 walls attached to a frame 2010 and modular decorative panels 2030. The cubicle 2000 may also comprise a desk surface 2040, cabinet 2050, shelf 2052, and drawers 2054. A cubicle is typically made from an alloy, is modular in design, has legs for support, conduit for wiring, and units can be configured in numerous ways and are adaptable for changing office needs. Panels may be free-standing or attached directly to ready-made. Existing panel surface options provide sound absorption, visibility, and tackable surfaces with a fabric or laminated covering. In the cubicle 2000 of FIG. 14, an isotropically independent magnetic sheeting is applied to the outside of the interior 2020 and exterior 2022 walls of the individual pieces that comprise the cubicle 2000. In existing cubicles fabric is typically glued to the frame or the outside covering is a permanent laminated composite. As described with respect to FIG. 8, the independent magnetic orientation of the sheeting can either be glued or otherwise attached directly to the walls 2020 and 2022 or fastened directly the frame 2010 that is magnetically receptive in nature. The cubicle 2000 enables a business, corporation or individual to change the look and feel and the office environment to adapt to their needs, or corporate changes in logos and designs, events etc. An individual working inside of the cubicle would have the ability to design the inside with any covering that may be secured to the magnetic walls 2020 and 2022. For example, an employee of a corporation could print a photo, secure it to a magnetically receptive thin sheeting and then secure the photo the interior wall 2020. A business or corporation could change the exterior wall 2022 of the cubicle 2000 to suit corporate uniformity needs and demands.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A system for finishing a wall comprising:
   a set of modular wall covering units comprising an inner attractant layer and a decorative outer layer;
   a magnetic underlayment comprising an isotropic magnetic sheeting, the magnetic underlayment having been heat treated, wherein the heat treatment of the magnetic underlayment is at 158 degrees Fahrenheit for seven days; and
   a support layer comprising a wall board, an insulation layer, and a covering layer, the support layer being substantially vertical relative to a floor when installed in a structure;
   wherein the magnetic underlayment is secured to the support layer forming a combined magnetic surface assembly for receiving and supporting the set of modular wall covering units, and the set of modular wall covering units are adapted to be releasably secured to the combined magnetic surface assembly with the inner attractant layer facing the magnetic underlayment, and wherein the weight of the set of modular wall covering units, when installed in a vertical orientation, is supported by the combined magnetic surface assembly.

2. The system of claim 1 further comprising a frame.

3. The system of claim 1 further comprising wherein the support layer is disposed on the frame.

4. The system of claim 1 further comprising wherein the decorative layer is adapted to resemble the appearance of tile, plaster, wood, slate, granite, painted wall, wall paper, Venetian plaster, wainscoting, trim wood, branding, logos, or art.

5. The system of claim 1 further comprising wherein the magnetic underlayment is permanently bonded to the support layer.

6. The system of claim 1 further comprising wherein the magnetic underlayment is affixed to the support layer by an adhesive or by a fastening means.

7. The system of claim 1 further comprising wherein the magnetic underlayment is supported by a fastening apparatus.

8. The system of claim 1 further comprising wherein the set of modular wall covering units are adapted to be releasably attached to the magnetic underlayment.

9. The system of claim 1 further comprising wherein the wall board comprises mineral wool.

10. The system of claim 1 further comprising wherein the covering layer comprises a flame retardant outer layer.

11. The system of claim 1 further comprising wherein the insulation layer comprises fire retardant glass fibers.

12. The system of claim 1 further comprising wherein the support layer does not require finishing.

13. A method for finishing a surface comprising:
   securing a magnetic underlayment comprising an isotropic magnetic sheeting to an exposed surface of a support structure, the magnetic underlayment comprising an isotropic magnetic sheeting, the magnetic underlayment having been heat treated at 158 degrees Fahrenheit for seven days; and
   releasably and magnetically attaching each of a set of modular surface covering units comprising an inner magnetically receptive layer and a decorative outer layer to the magnetic underlayment, wherein attaching the set of modular surface covering units comprises disposing the inner magnetically receptive layer to face the magnetic underlayment with the decorative outer layer exposed to form a combined magnetic surface assembly and wherein the set of modular surface covering units, when installed on the magnetic underlayment, is removably affixed to the magnetic underlayment and supported by the support surface.

14. The method of claim 13 further comprising wherein the decorative layer is adapted to resemble the appearance of tile, plaster, wood, slate, granite, painted wall, wall paper, Venetian plaster, wainscoting, trim wood, branding, logos, or art.

15. The method of claim 13 further comprising wherein the magnetic underlayment is permanently bonded to the support structure.

16. The method of claim 13 further comprising wherein the magnetic underlayment is affixed to the support structure by an adhesive or by a fastening means.

17. The method of claim 13 further comprising wherein the magnetic underlayment is supported by a fastening apparatus.

18. The method of claim 13 further comprising attaching a support layer comprising a wall board, an insulation layer, and a covering layer to a support frame wherein the wall board comprises mineral wool.

19. The method of claim 18 further comprising wherein the covering layer comprises a flame retardant outer layer.

20. The method of claim 18 further comprising wherein the insulation layer comprises fire retardant glass fibers.

21. The method of claim 18 further comprising wherein the support layer does not require finishing.

22. A system for finishing a surface comprising:
a set of modular surface covering units comprising an inner attractant layer and a decorative outer layer;
a magnetic underlayment comprising an isotropic magnetic sheeting, the magnetic underlayment having been heat treated, wherein the heat treatment of the magnetic underlayment is at 158 degrees Fahrenheit for seven days; and
wherein the magnetic underlayment is installed over a support surface, and the set of modular surface covering units are adapted to be releasably secured to the installed magnetic underlayment with the inner attractant layer facing the magnetic underlayment to form a combined magnetic surface assembly, and wherein the set of modular surface covering units, when installed on the magnetic underlayment, is removably affixed to the magnetic underlayment and supported by the support surface.

23. The system of claim 22 further comprising wherein the magnetic underlayment is permanently bonded to the support surface.

24. The system of claim 22 further comprising wherein the magnetic underlayment is affixed to the support surface by an adhesive or by a fastening means.

25. The system of claim 22, wherein the magnetic underlayment is characterized by one or more of the properties consisting of: thickness of 0.060 inches (1.52 mm); hardness of Shore D60; specific gravity of 3.5; a shrinkage 1.5% caused by the heat treatment; tensile strength of 700 psi (49 Kg/cm^2); and parallel poles (north south) along a length at 2.0 mm intervals.

26. The system of claim 1, wherein the magnetic underlayment is characterized by one or more of the properties consisting of: thickness of 0.060 inches (1.52 mm); hardness of Shore D60; specific gravity of 3.5; a shrinkage 1.5% caused by the heat treatment; tensile strength of 700 psi (49 Kg/cm^2); and parallel poles (north south) along a length at 2.0 mm intervals.

* * * * *